(12) United States Patent
Fukawa

(10) Patent No.: US 7,266,203 B2
(45) Date of Patent: Sep. 4, 2007

(54) INFORMATION RECORDING/REPRODUCING SYSTEM BEING ABLE TO LIMIT AN ACCESS AND A METHOD THEREOF

(75) Inventor: Kiyotaka Fukawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 672 days.

(21) Appl. No.: 10/280,933

(22) Filed: Oct. 25, 2002

(65) Prior Publication Data

US 2003/0145211 A1 Jul. 31, 2003

(30) Foreign Application Priority Data

Jan. 31, 2002 (JP) .............................. 2002-022945

(51) Int. Cl.
H04L 9/00 (2006.01)
G06F 17/30 (2006.01)
G06F 21/00 (2006.01)

(52) U.S. Cl. .............................. 380/286; 726/4; 726/7; 713/194; 705/56

(58) Field of Classification Search .................... 726/3, 726/4; 380/277, 286
See application file for complete search history.

(56) References Cited

U.S. PATENT DOCUMENTS

| | | | |
|---|---|---|---|
| 5,623,546 A * | 4/1997 | Hardy et al. ................. 713/193 |
| 5,857,021 A | 1/1999 | Kataoka et al. ................. 380/4 |
| 6,920,563 B2 * | 7/2005 | Kohl et al. ................... 713/189 |
| 7,203,966 B2 * | 4/2007 | Abburi et al. ................. 726/29 |
| 7,222,104 B2 * | 5/2007 | Tadayon et al. ............... 705/54 |
| 2002/0002674 A1 | 1/2002 | Grimes et al. ............... 713/156 |
| 2002/0007454 A1 * | 1/2002 | Tarpenning et al. ........ 713/156 |

FOREIGN PATENT DOCUMENTS

| | | |
|---|---|---|
| JP | 06-208760 | 7/1994 |
| JP | 9-134311 | 5/1997 |
| WO | WO99/21094 | 4/1999 |

* cited by examiner

Primary Examiner—Christopher Revak
(74) Attorney, Agent, or Firm—Greer, Burns & Crain, Ltd.

(57) ABSTRACT

In an internal circuit type, an encryption circuit is included in a device. Information specific to the device including the encryption circuit is preregistered to a net authentication site. A portable storage medium is inserted into an information recording/reproduction mechanism of the device, and an access is made to the net authentication site with a host PC. When a right to access to the net authentication site is obtained, the net authentication site reads shared information stored on the portable storage medium, and makes a comparison between the shared information and the contents of a database. If a match is found as a result of the comparison, the net authentication site writes devices-specific information to the shared information on the portable storage medium, so that encrypted data on the portable storage medium can be read with the device.

16 Claims, 26 Drawing Sheets

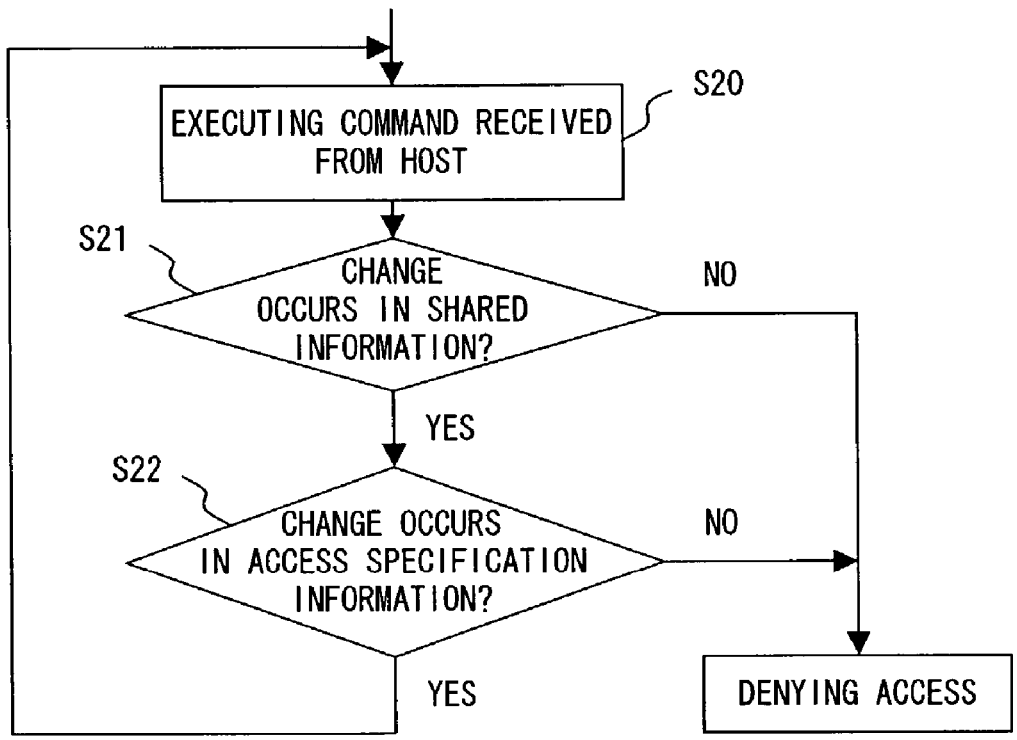
F I G. 4

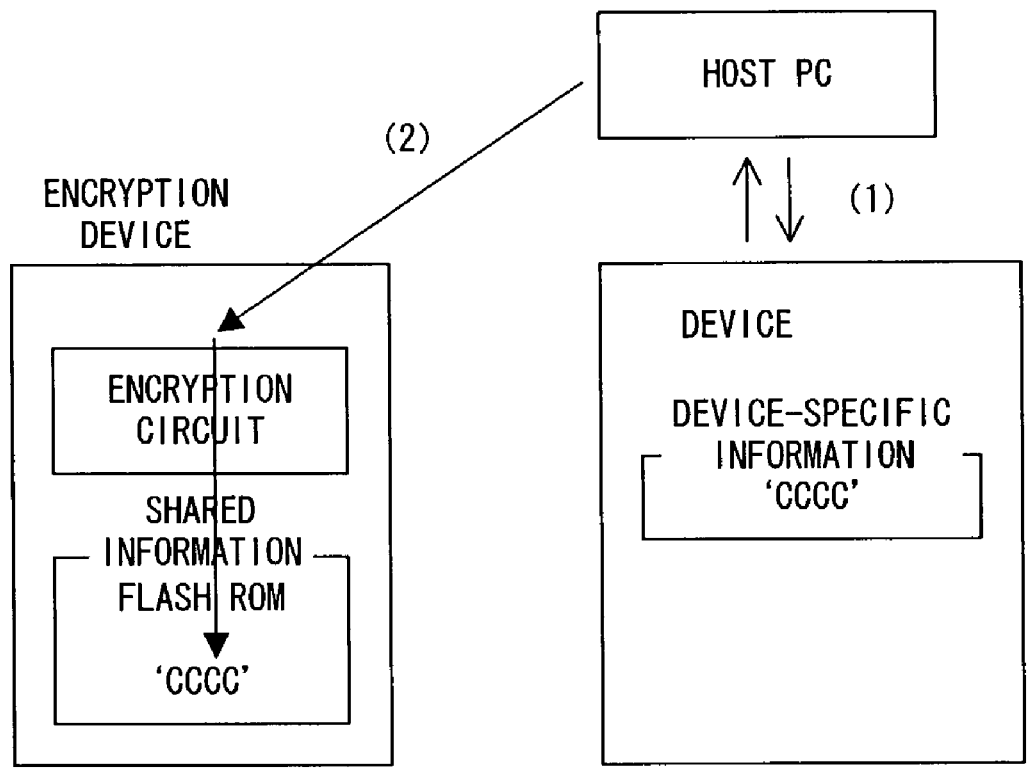
F I G. 7

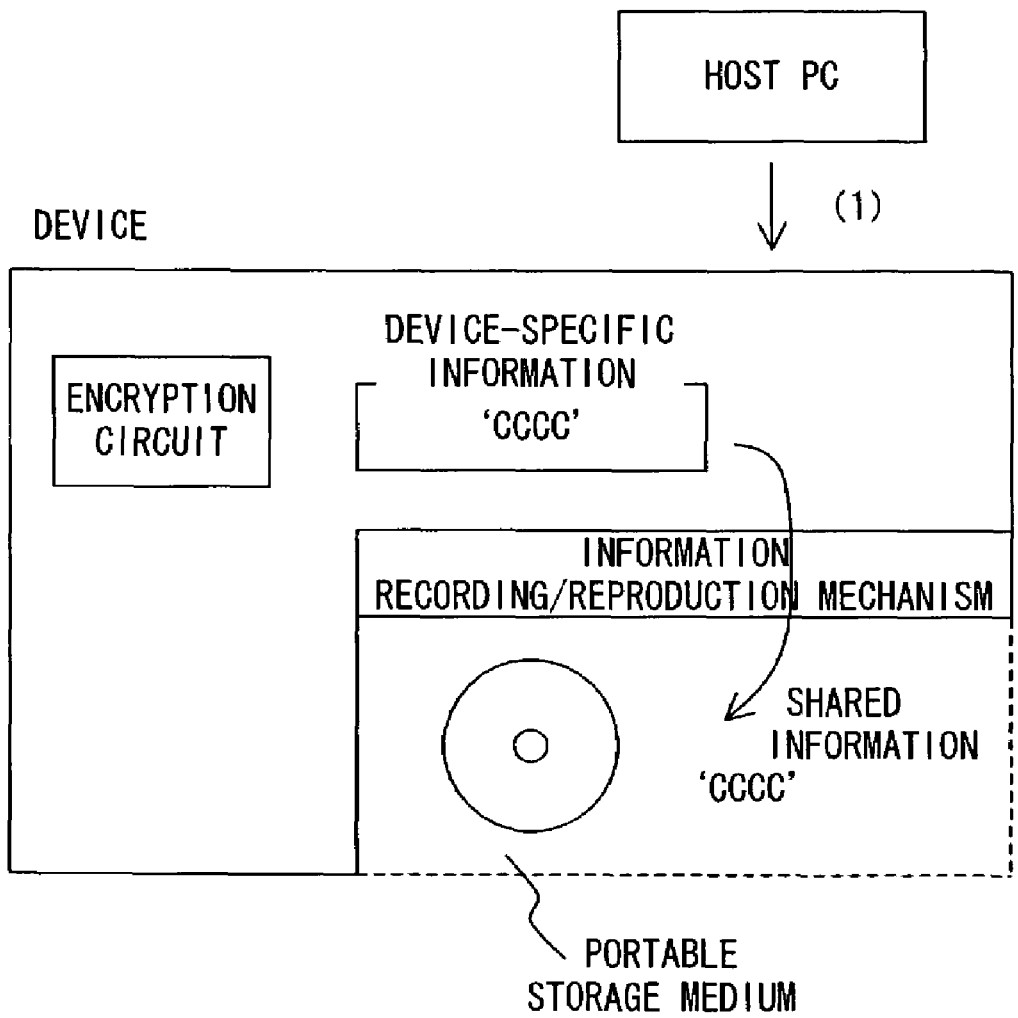
F I G. 8

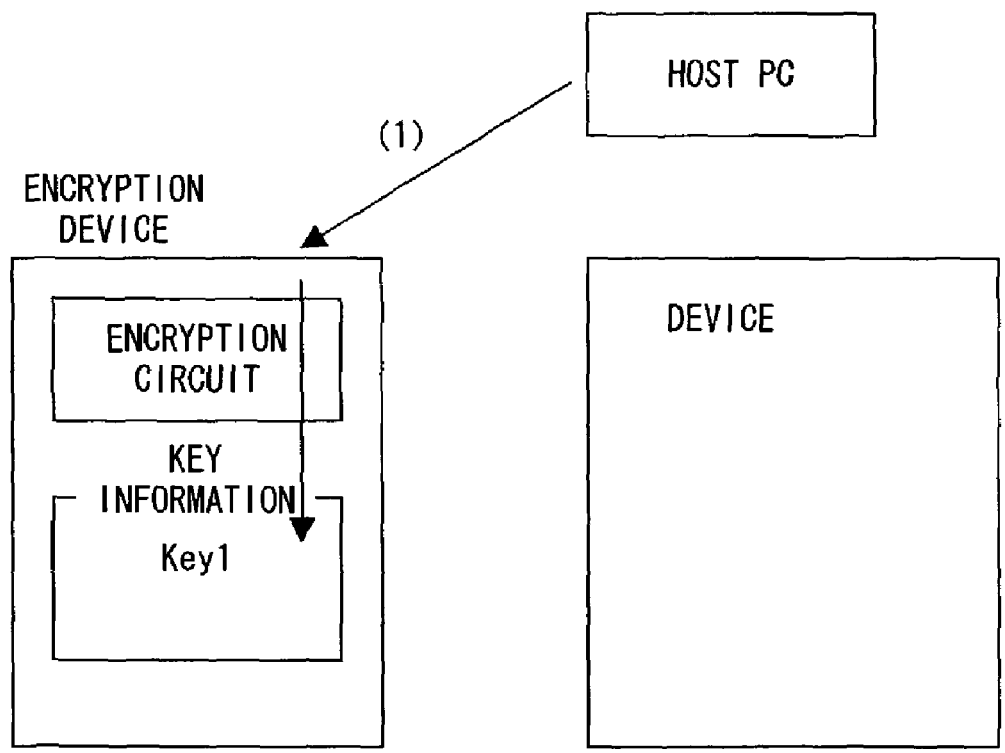
F I G. 1 0

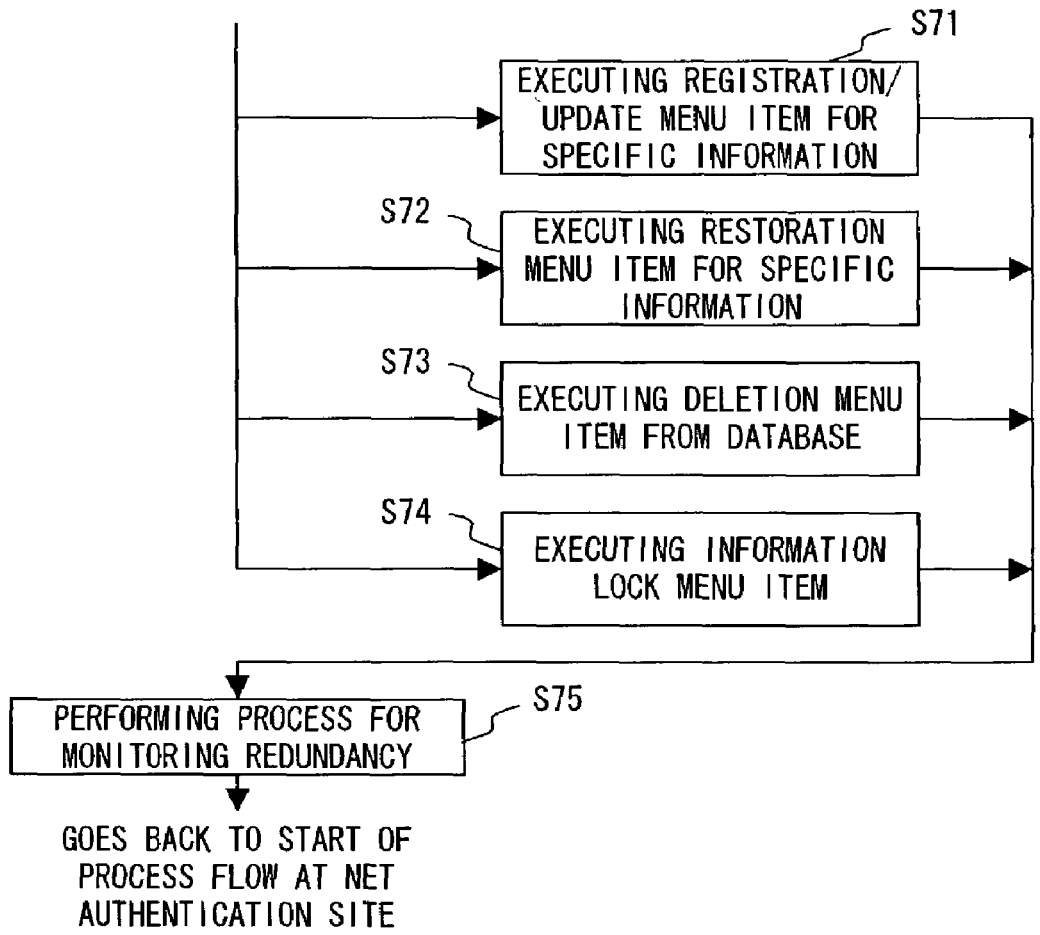
F I G. 1 7

| MANAGEMENT SECTION | LOG-IN INFORMATION ID/PASSWORD | REGISTRATION NO. | MONITORING FLAG | VALID TERM YYYY/MM | SPECIFIC ENCRYPTION CIRCUIT | INFORMATION DEVICE | SHARED INFORMATION | KEY INFORMATION |
|---|---|---|---|---|---|---|---|---|
| 1 | User_A Pswd_A | 0001 | OFF | NONE | SYP004 | HDD010 | HDD010 HDD002 | abcdef ghijkl mnopqr |
| 2 | User_B Pswd_B | 0002 | OFF | NONE | NONE | RMV007 | NONE | agmbhn |
|  |  | 0012 | OFF | NONE | SYP024 | PC0009 | PC0009 | ekqflr dkrmel |
| ... | ... | ... | ... | ... | ... | ... | ... | ... |
| 16 | User_X Pswd_X | 0010 | ON | 201310 | SYP035 | PC0018 | PC0018 | ciodjp |
| ... | ... | ... | ... | ... | ... | ... | ... | ... |

F I G. 2 6

INFORMATION RECORDING/REPRODUCING SYSTEM BEING ABLE TO LIMIT AN ACCESS AND A METHOD THEREOF

BACKGROUND OF THE INVENTION

1. Field of the Invention

The present invention relates to an access limitation method for use in an information recording/reproducing device that can effectively limit an access.

2. Description of the Related Art

Recently, information processing devices have been improved, and it has become essential to hold and use information as electronic data that can be read by information processing devices on the business scene, etc. In such a case, electronic data can be copied with ease. Therefore, it is necessary to prevent an important document, etc. from being easily copied, and to guarantee that the document is an original. Normally, such an important document is held by being encrypted, and only a person who knows a particular key can decrypt the document. However, if an important document is only encrypted with a key, anybody can view the document in the case where the key is leaked out due to some reason or other. Accordingly, to further secure confidentiality, an access to electronic data is limited by using information specific to a device that is used to read a medium storing the electronic data.

Namely, an encrypted code itself generated from an encryption circuit can be leveraged as an access limitation if a key does not match. Additionally, a medium, to which device-specific information is written, enables a device to make an access only if the device matches the written device-specific information. Key information is registered to an encryption device, which has a mechanism for authorizing the use of a key according to a user ID/password. Accordingly, if a device such as a PC, an information recording/reproducing device, etc. is lost or damaged, a device having exactly the same device-specific information is required. However, there are no alternative methods.

Conventionally, if a device being a medium reading device such as a PC, an information recording/reproducing device, etc. becomes unavailable due to a fault, etc., specific information registered to the device is lost, and there are no measures to restore the information. Since a function for reading device-specific information does not exist, device-specific information must be directly written to a corresponding device. If attempts are made to register specific information to a device at a remote site or many devices, this requires much labor.

Additionally, if an encryption device is stolen, and its key information is also stolen, data can be decrypted and viewed. It is possible to implement a configuration where device-specific information is written to a medium, which can be read only by a device having the written device-specific information. However, if only information specific to one device is written to a medium, and if the device is damaged, the medium can never be used.

SUMMARY OF THE INVENTION

An object of the present invention is to provide an information recording/reproducing system that enables an access to a medium despite an occurrence of a fault, while effectively limiting an access.

A first system according to the present invention is an information recording/reproducing system that can limit an access to encrypted data. This system comprises: a first storing unit storing, in an encryption device encrypting/decrypting data, encryption-circuit-specific information for identifying the encryption device, shared information including one or more pieces of device-specific information of devices that can be used to read a medium by being connected to the encryption device, and one or more pieces of key information for encrypting/decrypting data; a second storing unit storing, on the medium, encryption circuit specification information for identifying an encryption device to be used when the data is encrypted/decrypted; a detecting unit detecting a match between the shared information of the encryption device and the information specific to a device used to access the encrypted data, and further detecting a match between the encryption-circuit-specific information and the encryption circuit specification information, when the access is made to the encrypted data; and a restoring unit prestoring the encryption-circuit-specific information of the encryption device, the shared information, and the key information at a predetermined site through r a network, restoring the shared information and the key information to a new encryption device from the predetermined site, and allowing only the new encryption device, to which the information are restored, to access the encrypted data, when the encryption circuit becomes unavailable.

A second system according to the present invention is an information recording/reproducing system that can limit an access to encrypted data. This system comprises: a first storing unit storing, in a device having an encryption circuit encrypting/decrypting data, device-specific information for identifying the device, and one or more pieces of key information for encrypting/decrypting data stored on a medium; a second storing unit storing, on the medium, shared information for identifying a device to be used when the encrypted data is encrypted/decrypted; a detecting unit detecting a match between the shared information and device-specific information of a device used to access the encrypted data, when the access is made to the encrypted data; and a restoring unit prestoring the device-specific information of the device and the key information at a predetermined site through a network, respectively restoring the shared information and the key information to the medium and a new device from the predetermined site, and allowing only the new device and the medium, to which the information are restored, to access the encrypted data, when the device becomes unavailable.

According to the present invention, with a method limiting an access by using device-specific information, etc. in addition to an encryption key, even if a device having device-specific information is lost, an access can be made to encrypted data with a new device by registering information to a predetermined site connected via a network, and by restoring the information to the new device.

Accordingly, it is possible to provide a system that can securely perform restoration operations in cases such as the case where a device is lost, or the like, and can limit an access while securing the confidentiality of encrypted data.

BRIEF DESCRIPTION OF THE DRAWINGS

FIG. 4 is a flowchart showing the operations for recording/reproducing data, according to the preferred embodiment of the present invention (No. 2);

FIG. 7 shows the mechanism for limiting an access based on the identity of a device, according to the preferred embodiment of the present invention (No. 1);

FIG. 8 shows the mechanism for limiting an access based on the identity of a device, according to the preferred embodiment of the present invention (No. 2);

FIG. 10 shows the mechanism for limiting an access based on the identity of a device, according to the preferred embodiment of the present invention (No. 4);

FIG. 17 is a flowchart showing the operations performed at the net authentication site (No. 2);

FIG. 26 exemplifies the configuration of a database possessed by a net authentication site.

DESCRIPTION OF THE PREFERRED EMBODIMENTS

According to a preferred embodiment of the present invention, a device limitation function is enhanced by making also an encryption device possess specific information. Additionally, an encryption device can be specified by making a data side possess specific information of an encryption device. Furthermore, specific information is held at a third site (such as a net authentication site, etc.). Even if an access is denied due to a mismatch of device-specific information, a write of restoration information, and an addition of device-specific information can be implemented via the net authentication site.

Figure 1:
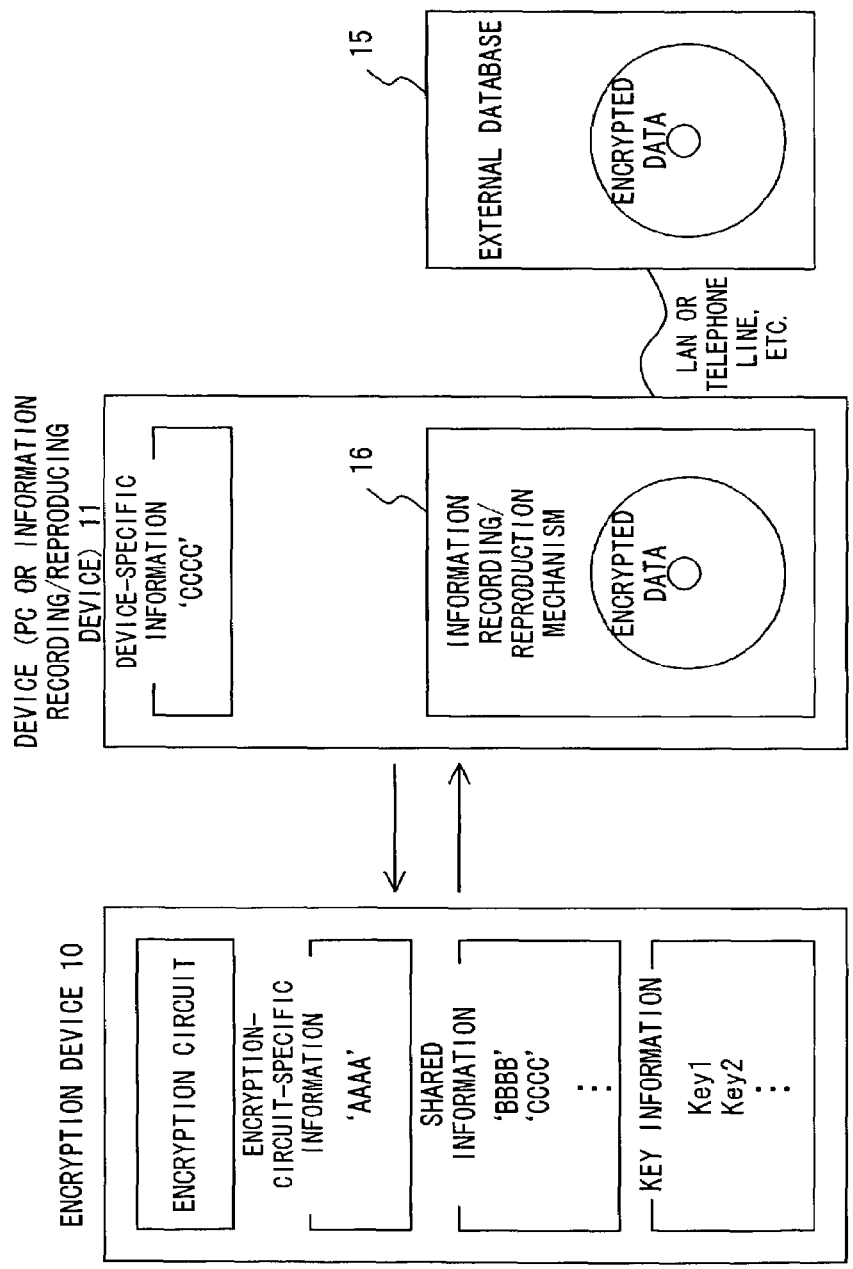
FIG. 1 shows the configuration of a system in the case where an encryption device is external to an information recording/reproducing device.
Figure 2:
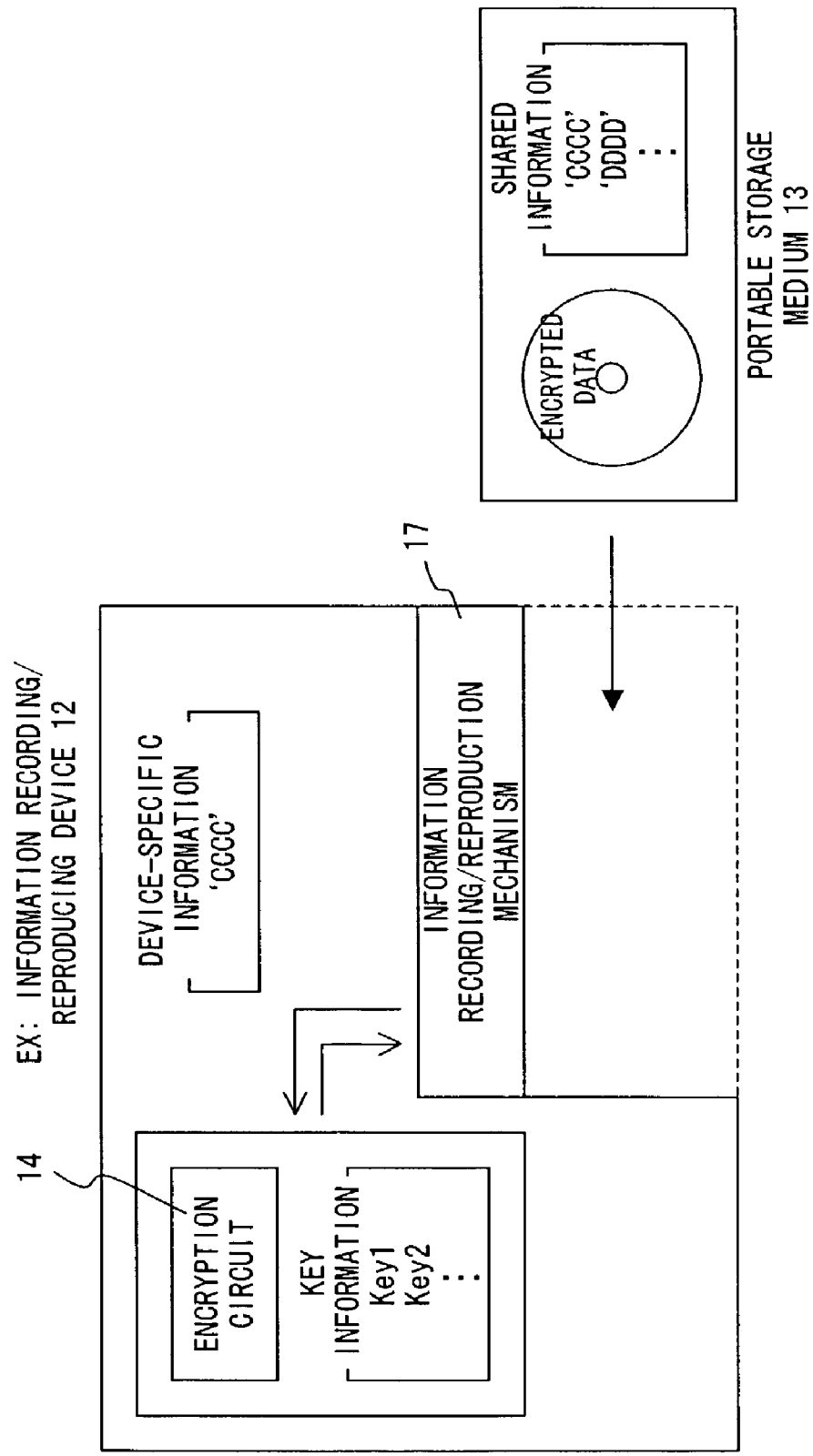
FIG. 2 shows the configuration of a system in the case where an encryption device is included in an information recording/reproducing device.

FIG. 1 shows the configuration of a system in the case where an encryption device is external to an information recording/reproducing device, whereas FIG. 2 shows the configuration of a system in the case where an encryption device is included in an information recording/reproducing device.

In FIG. 1, an encryption device 10 and a PC or an information recording/reproducing device 11 are connected. For the device 11, an internal information recording/reproduction mechanism 16 or an external database 15 is arranged. Encrypted data is stored on a storage medium of the internal information recording/reproduction mechanism 16 or a storage medium of the external database 15. The external database 15 is connected to the device 11 via a LAN, a telephone line, etc. At this time, device-specific information such as a device number for uniquely identifying a PC or an information recording/reproducing device, which can be used to read encrypted data, and the like are stored in the device 11. In the encryption device 10, encryption-circuit-specific information, shared information, and key information in addition to the encryption circuit are included. Here, the encryption-circuit-specific information is a device number for uniquely identifying an encryption circuit, or the like, and the shared information is a device number for uniquely identifying a PC or an information recording/reproducing device, which can be used along with the encryption circuit to read encrypted data, and a plurality of pieces of shared information can be registered. The key information is information in which a key used when encrypted data is actually decrypted is registered.

In the system of the internal encryption circuit type shown in FIG. 2, an encryption circuit 14 is included in an information recording/reproducing device 12. In the information recording/reproducing device 12, key information for decrypting encrypted data is included in addition to the encryption circuit 14, and device-specific information is set in a similar manner as in the case of FIG. 1. In the information recording/reproducing device 12, an information recording/reproduction mechanism 17 is arranged, and a portable storage medium 13 storing encrypted data and shared information is inserted into. Examples of the portable storage medium 13 include a CD-ROM, a DVD, a flexible disk, etc.

In any configuration, the encryption circuit has encryption-circuit-specific information, and the device 11 or 12 has device-specific information. Note that, however, the internal encryption circuit type stores not encryption circuit information, but only device-specific information. This is because the encryption circuit alone cannot be separated physically.

Figure 3:
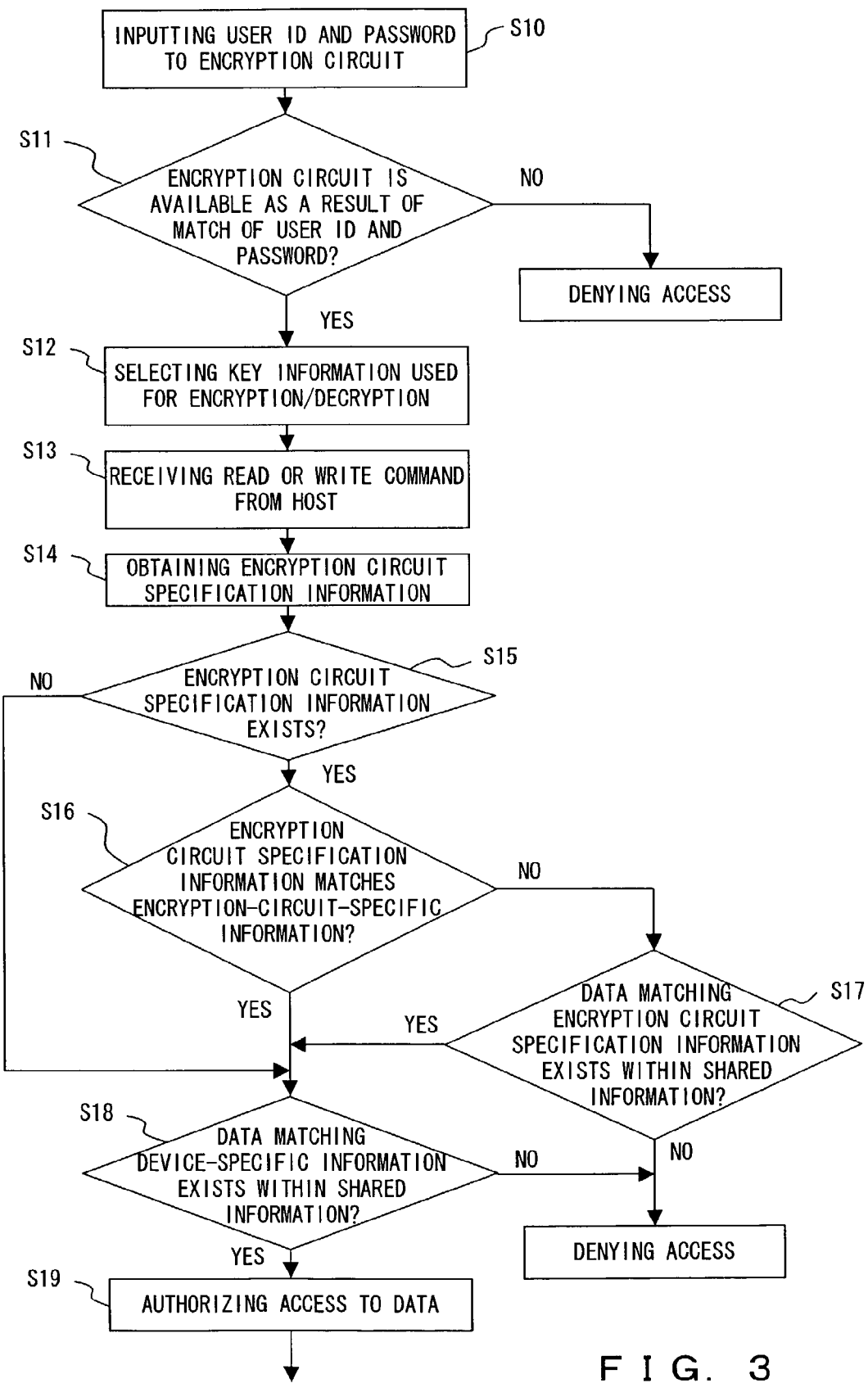
FIG. 3 is a flowchart showing the operations for recording/reproducing data, according to a preferred embodiment of the present invention (No. 1)

FIGS. 3 and 4 are flowcharts showing the operations for recording/reproducing data, according to the preferred embodiment of the present invention.

First, a user inputs a user ID and a password to an encryption circuit in step S10. Next, in step S11, the encryption circuit examines the user ID and the password, and determines whether or not the user is a person who is authorized to use the encryption circuit. If the user is not a person who is authorized to use the encryption circuit, the encryption circuit denies access.

If it is determined that the user is a person who is authorized to use the encryption circuit, key information used for encryption/decryption is selected in step S12. Then, in step S13, a read or a write command is received from a host (the host referred to here is a PC used by the user or an information processing device having a user interface, which is connected to an information recording/reproducing device, and is a device that is connected to an encryption device and the information recording/reproducing device, which execute an instruction to encrypt and store data, and an instruction to read and decrypt encrypted data). Then, in step S14, encryption circuit specification information is obtained.

In step S15, it is determined whether or not the encryption circuit specification information exists. If it is determined that the encryption circuit specification information does not exist, the process proceeds to step S18. If it is determined that the encryption circuit specification information exists in step S15, it is further determined whether or not the encryption circuit specification information matches encryption-circuit-specific information in step S16. If the result of the determination made in step S16 is "NO", it is determined whether or not data matching the encryption circuit specification information exists within shared information in step S17.

If the result of the determination made in step S17 is "NO", access is denied. If the result of the determination is "YES" in step S17, the process proceeds to step S18. If the result of the determination made in step S16 is "YES", the process also proceeds to step S18.

In step S18, it is determined whether or not information matching device-specific information exists within the shared information. If the result of the determination made in step S18 is "NO", access is denied. If the result of the determination made in step S18 is "YES", aft-access to data is authorized in step S19. The process then proceeds to step S20.

In step S20, the command received from the host (defined as described above) is executed. In step S21, it is determined whether or not a change occurs in the shared information. If the result of the determination made in step S21 is "NO", access is denied. If the result of the determination made in step S21 is "YES", it is further determined whether or not a change occurs in the access specification information in step S22. If the result of the determination made in step S22 is "NO", an access is denied. If the result of the determination made in step S22 is "YES", the process goes back to step S20 in which another command is executed. This process is repeated until all of commands are executed.

Figure 5:
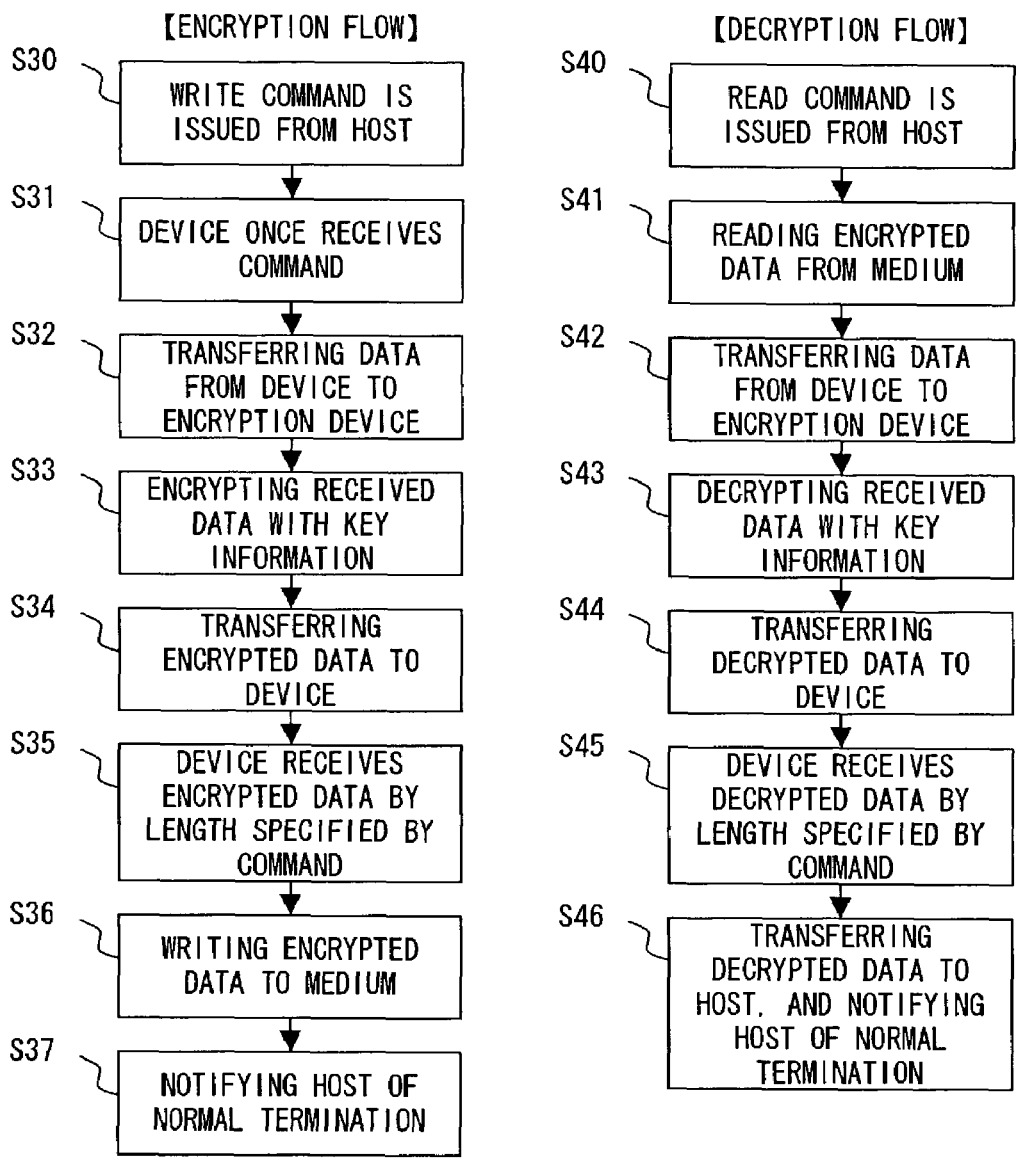
FIG. 5 shows encryption and decryption flows in a system of an external circuit type.
Figure 6:
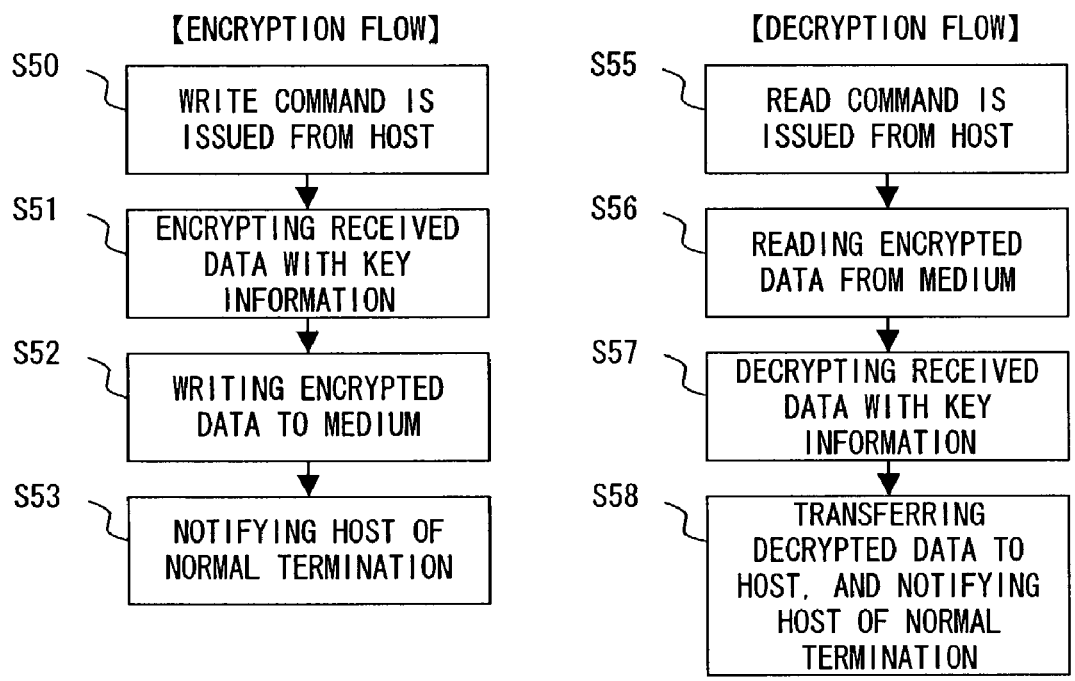
FIG. 6 shows encryption and decryption flows in a system of an internal circuit type.

FIG. 5 shows the encryption and decryption flows in the system of the external circuit type, whereas FIG. 6 shows the encryption and decryption flows in the system of the internal circuit type.

In the encryption flow shown in FIG. 5, when a write command is issued from the host in step S30, the PC or the information recording/reproducing device (referred to simply as a device) once receives the command in step S31. In step S32, data is transferred from the device to the encryption device. In step S33, the received data is encrypted with key information. In step S34, the encrypted data is transferred to the device. In step S35, the device receives the encrypted data by the length specified by the command. In step S36, the encrypted data is written to a medium. In step S37, normal termination is notified to the host. Here, the process is terminated.

In the decryption flow shown in FIG. 5, a read command is issued from the host in step S40. In step S41, the encrypted data is read from the medium. In step S42, the data is transferred from the device to the encryption device. In step S43, the received data is decrypted with the key information. In step S44, the decrypted data is transferred to the device. In step S45, the device receives the decrypted data by the length specified by the command. In step S46, the decrypted data is transferred to the host, and normal termination is notified.

In the decryption flow in the case of the internal circuit type in FIG. 6, when a write command is issued from the host in step S50, received data is encrypted with key information in step S51. Then, in step S52, the encrypted data is written to a medium. In step S53, normal termination is notified to the host, and the process is terminated.

In the decryption flow, when a read command is issued from the host in step S55, the encrypted data is read from the medium in step S56. In step S57, the received data is decrypted with the key information. In step S58, the decrypted data is transferred to the host, and normal termination is notified to the host. Here, the process is terminated.

FIGS. 7 to 13 explain the mechanism for limiting an access based on the identity of a device, according to the preferred embodiment of the present invention.

Figure 12A:
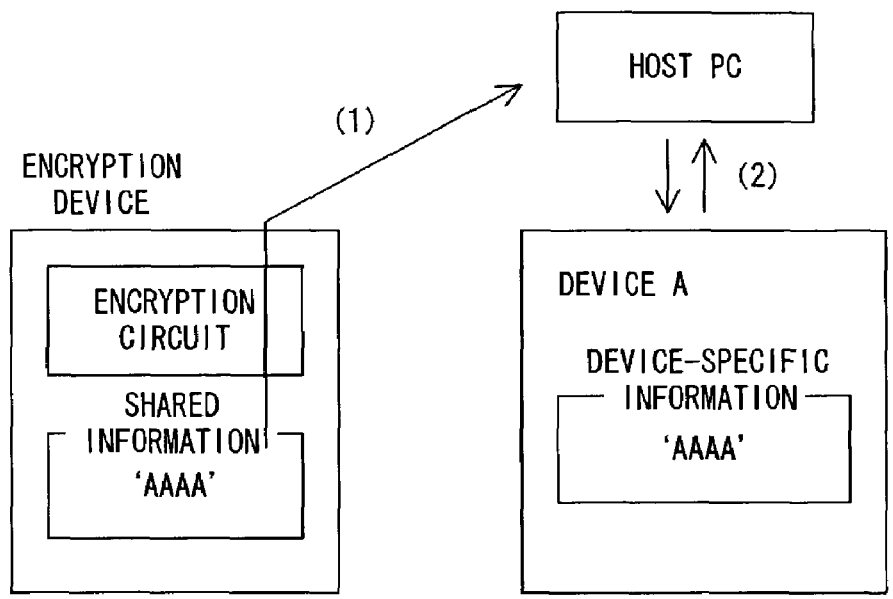
FIG. 12 shows the mechanism for limiting an access based on the identity of a device, according to the preferred embodiment of the present invention (No. 6)
Figure 12B:
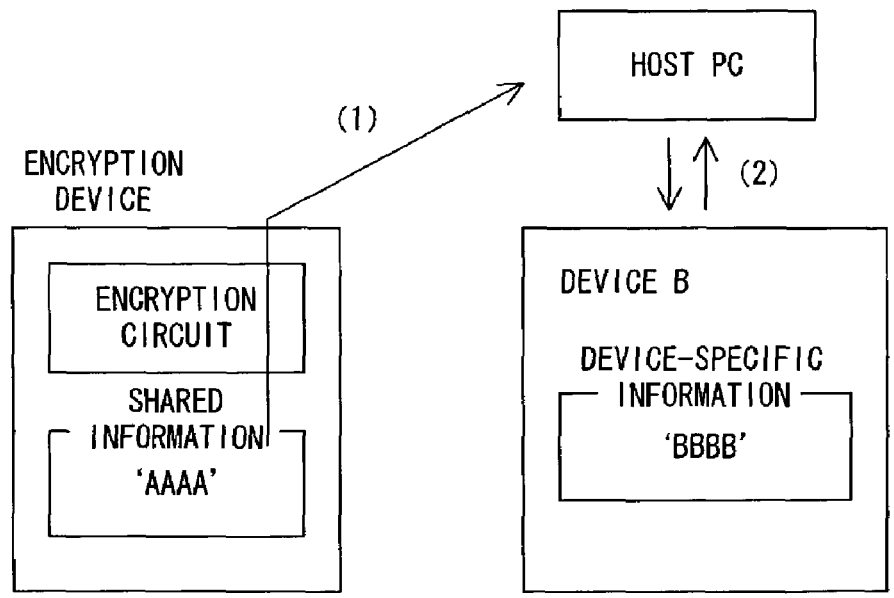
Figure 13A:
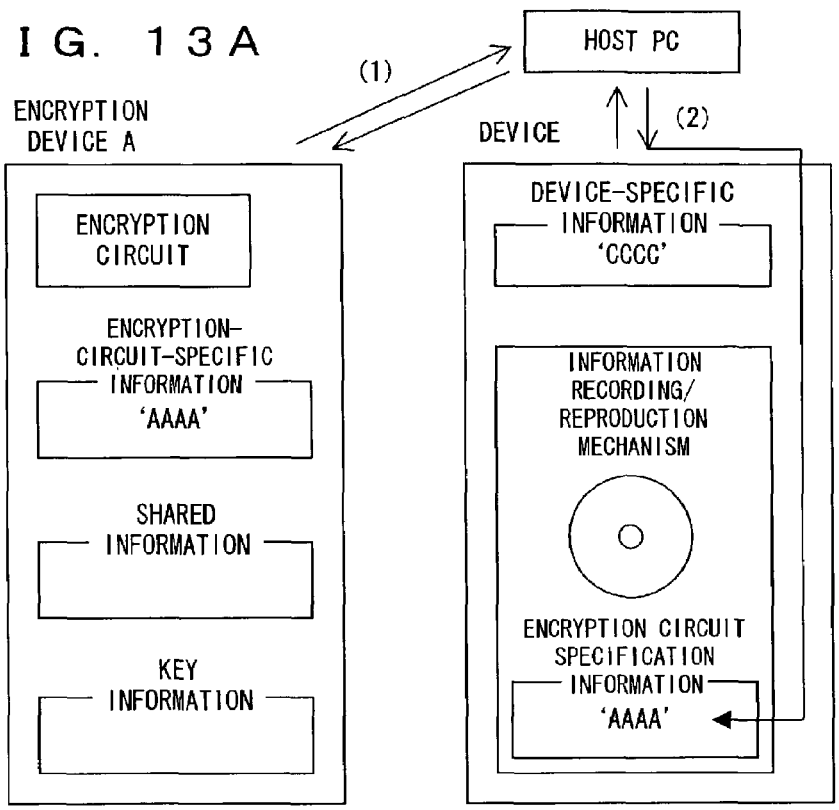
FIG. 13 shows the mechanism for limiting an access based on the identity of a device, according to the preferred embodiment of the present invention (No. 7)
Figure 13B:
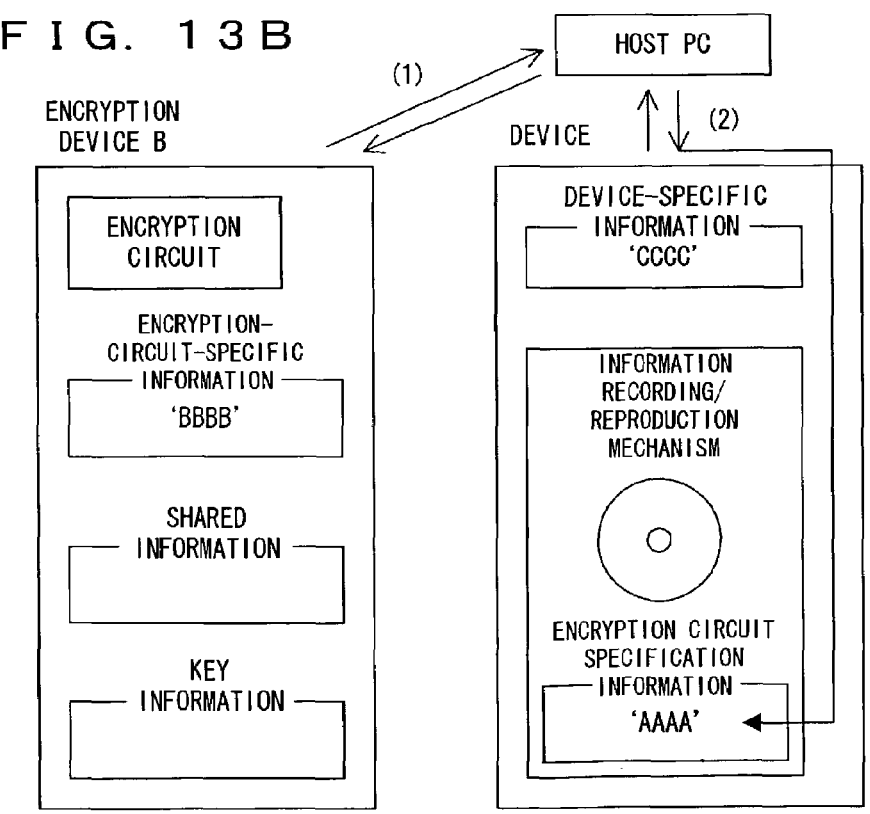

FIG. 12 explains the mechanism for imposing a limitation on a device in the system having the configuration shown in FIG. 1 or 2. Shared information shown in FIG. 12 must be pre-registered to the encryption device side or the device side with the method shown in FIG. 7 or 8. Inversely, FIG. 13 shows that an encryption device used can be specified from a data side. An encryption device used must be written to target data beforehand with the method shown in FIG. 9.

Figure 11:
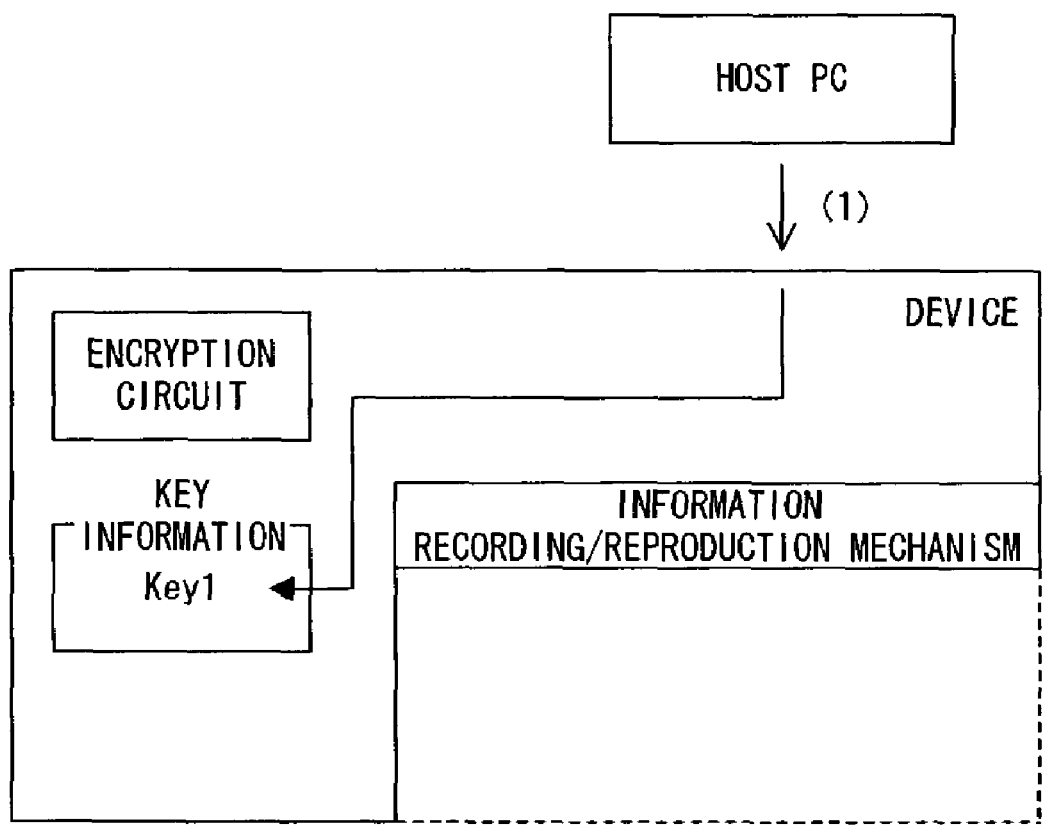
FIG. 11 shows the mechanism for limiting an access based on the identity of a device, according to the preferred embodiment of the present invention (No. 5)

The encryption circuit is required to encrypt data with a key. This preferred embodiment adopts an existing method with which key information is stored on the side of the encryption circuit as shown in FIGS. 10 and 11, and the encryption function can be used only by specifying a key number from the host without inputting the key information.

A write of shared information in the external circuit type in which the encryption device is arranged as an external circuit is made as shown in FIG. 7. First, the host PC obtains device-specific information by communicating the device-specific information with the device (information recording/reproducing device) (1). Next, the host PC issues an instruction to write shared information to the encryption device, which writes as the shared information the obtained device-specific information to a memory such as a flash ROM, etc. of the encryption device (2).

In the internal circuit type in which the encryption device is arranged within the device (information recording/reproducing device), as shown in FIG. 8, the host PC directly issues to the device an instruction to write device-specific information to a portable storage medium which is inserted into the device, and the device is made to store the device-specific information as shared information on the portable storage medium (1).

Figure 9:
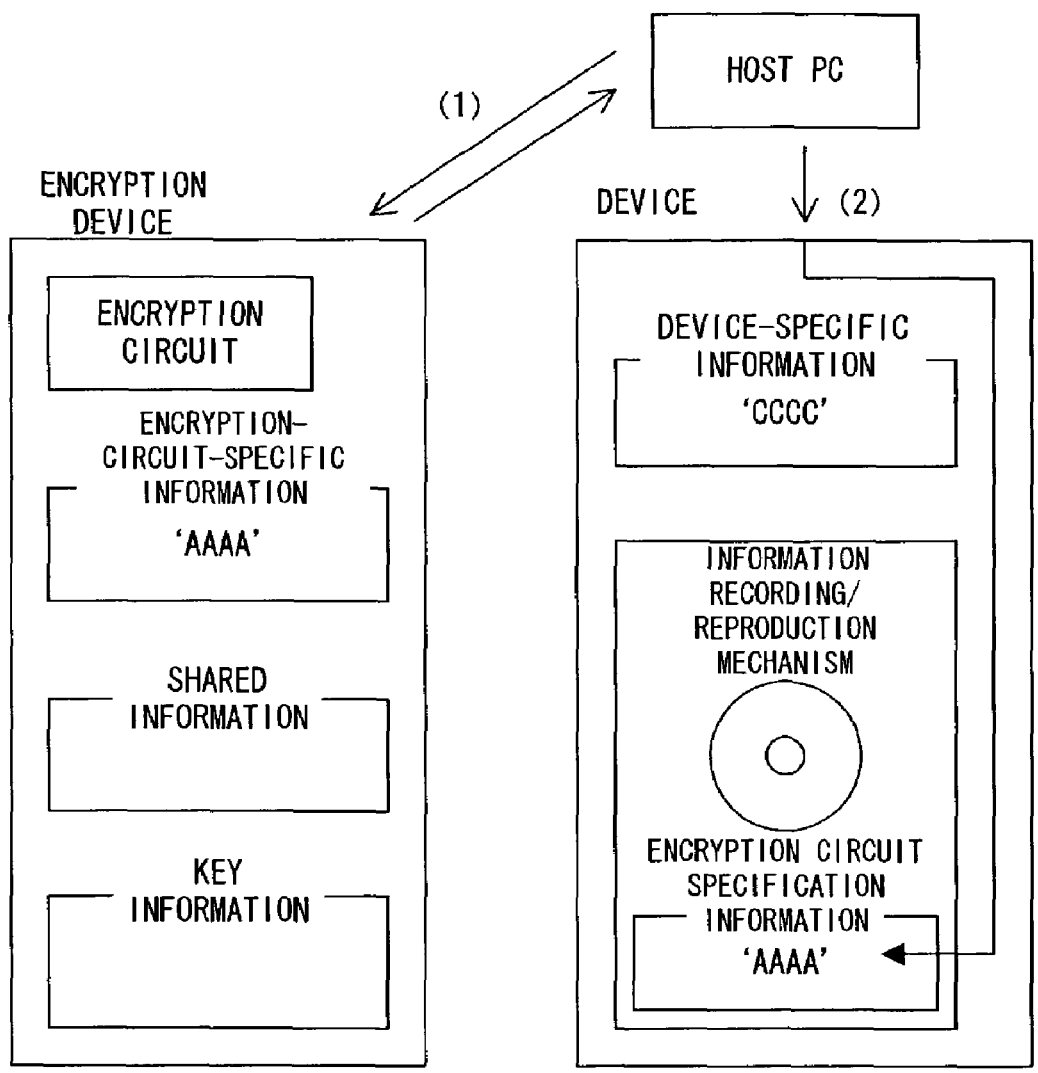
FIG. 9 shows the mechanism for limiting an access based on the identity of a device, according to the preferred embodiment of the present invention (No. 3)

Additionally, in the external circuit type, information specific to the encryption device is used to limit an access, since the encryption device is external to the device. Namely, as shown in FIG. 9, the host PC communicates with the encryption device, and obtains encryption-circuit-specific information (1). Then, the host PC issues an instruction to write the encryption-circuit-specific information, so that the encryption-circuit-specific information or its accompanying information is written to a memory, etc. (2).

Furthermore, a write of key information is made as shown in FIGS. 10 and 11. FIG. 10 shows the case of the external circuit type, whereas FIG. 11 shows the case of the internal circuit type. In the case of the external circuit type, as shown in FIG. 10, an instruction to write key information is issued from the host PC to the encryption device, so that the key information is written to a memory within the encryption device (1). In the case of the internal circuit type, as shown in FIG. 11, an instruction to write key information is issued from the host PC to the device, so that the key information is written to a key information storage area within the device.

FIG. 12 explains the mechanism for imposing a limitation on a device. (a) in FIG. 12 shows the case where an access is authorized, whereas (b) in FIG. 12 shows the case where an access is denied. First, a host PC obtains shared information of the encryption device (1). Then, the shared information is transmitted from the host PC to the device. Upon receipt of the shared information, the device verifies whether or not information within the shared information matches the device-specific information of a device A itself. In the case of(a) in FIG. 12, the shared information is "AAAA", and also the device-specific information is "AAAA". Therefore, the device A can access encrypted data (not shown).

In the meantime, in the case of (b) in FIG. 12, the host PC also obtains the shared information of the encryption device (1), and a comparison is made between device-specific information "BBBB" of a device B and the shared information "AAAA". In this case, these information do not match, an access with the device B is denied (2).

FIG. 13 explains an access limitation based on the identification of an encryption device. (a) in FIG. 13 shows the case where an access is authorized, whereas (b) in FIG. 13 shows the case where an access is denied. First, the host PC obtains encryption-circuit-specific information from an encryption device A (1), and transmits the encryption-circuit-specific information to the device. The device makes a comparison between the encryption circuit specification information stored on the medium inserted into the internal information recording/reproduction mechanism and the received encryption-circuit-specific information, and authorizes an access if they match. In this case, the encryption-circuit-specific information "AAAA" matches the encryption circuit specification information "AAAA". Therefore, an access can be made to the encrypted data stored on the medium which is inserted into the information recording/reproduction mechanism by using the encryption device A (2).

In the meantime, in the case of (b) in FIG. 13, encryption-circuit-specific information "BBBB" that the host PC obtains from an encryption device B (1), and transmits to the device does not match encryption circuit specification information "AAAA" set in the device. Therefore, an access to encrypted data with an encryption device B is denied.

With these functions, some pieces of information specific to the encryption device or the device come to exist within these devices. However, if the devices are damaged or lost, there are no ways to learn such information.

Figure 14:
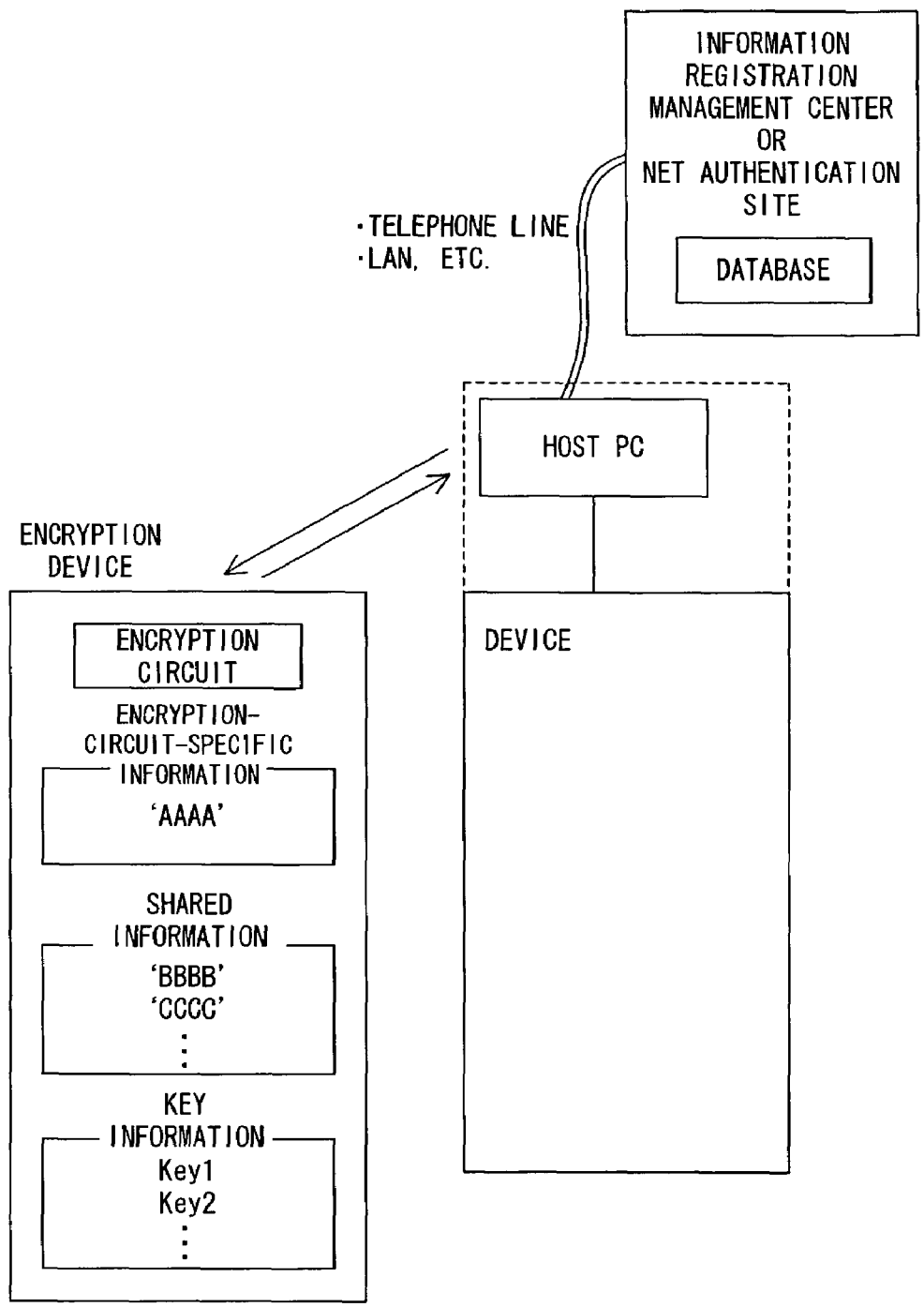
FIG. 14 explains the operations performed by the external circuit type apparatus when specific information is managed at a net authentication site.
Figure 15:
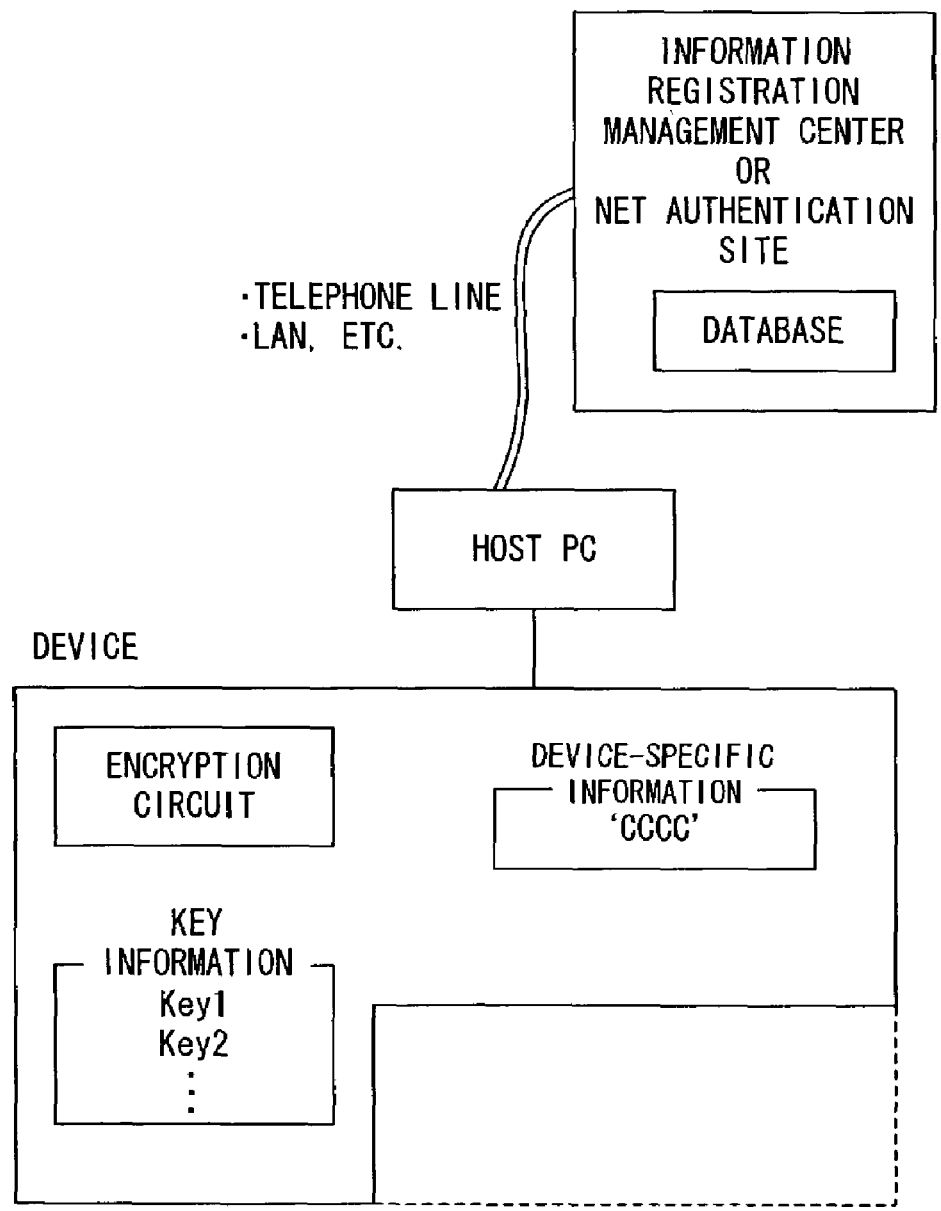
FIG. 15 explains the operations performed by the internal circuit type apparatus when specific information is managed at a net authentication site.

Accordingly, a means for absorbing specific information by setting up a net authentication site is prepared as shown in FIG. 14. FIG. 15 shows the case of the internal circuit type.

FIG. 14 explains the operations for managing specific information at a net authentication site, which are performed in the external circuit type, whereas FIG. 15 explains the operations for managing specific information at a net authentication site, which are performed in the internal circuit type.

In FIG. 14, a user connects his or her host PC to an information registration management center or a net authentication site via a telephone line, a LAN, etc. To connect the host PC to the net authentication site, a user ID and a password, which are unique to the user, are required. Then, according to a menu at the net authentication site, encryption-circuit-specific information, shared information, and key information are obtained from the encryption device connected to the host PC, and registered to a database at the net authentication site. In this case, an access range of the database at the net authentication site is limited for each user. If an access is made with a predetermined user ID and password, only information of the user corresponding to the user ID and password is made accessible.

Here, the user ID and password are issued by a network side in this preferred embodiment. When a user is authorized to use a network, he or she can access a net authentication site. At this time, a user ID and a password are obtained as communication information at the net authentication site, and it is determined whether or not to authorize the user to access the database possessed by the net authentication site. Or, if the user ID and the password are illegal, the user cannot make a connection to the network. Accordingly, the user cannot also access the database at the net authentication site.

In FIG. 15, a user also accesses a net authentication site with a user ID and a password, obtains device-specific information and key information according to a menu at the net authentication site, and registers the obtained information to a database at the net authentication site. The access range of this database is limited for each user as described above. Here, shared information is not registered to the database at the net authentication site. The reason is as follows. Shared information is stored on a portable storage medium in the case of the internal circuit type. However, it is considered to be impractical to insert into the device all of portable storage media that can possibly be used by the device and to register information. Therefore, only the device-specific information and the key information, which are possessed by the device, are registered.

The net authentication site renders a service that can register/update, restore, delete, and lock information according to the circumstances.

Functions of the Net Authentication Site
(1) Registering/updating specific information from the device or the encryption circuit.
(2) Restoring specific information to the device or the encryption circuit.
(3) Deleting specific information from the database.
(4) Locking information in the database.
  at the time of new registration/information update A user ID/password are set, and specific information is registered with the function (1).

In the case where the device or the encryption circuit is lost

Information in the database is temporarily locked (4). This operation prevents the information from being used by registering a user ID/password with an alias, if a third person obtains a lost device or circuit. The database monitors whether or not device-specific information is redundant within the entire registered information.

In the case where registered data becomes unnecessary
Corresponding information is deleted from the database with the function (3).

In the case where specific information is restored to an alternative to a lost device or encryption circuit Specific information is restored with the function (2). For the external circuit type, information (shared information and key information) except for encryption-circuit-specific information are restored to the encryption device. For the internal circuit type, (1) "restoration of specific information" is selected from a net authentication site.
(2) data used by the previous device is mounted in the new device.
(3) shared information within the mounted data is read and transmitted to the net authentication site.
(4) after the mounted data is verified to be the one for the previously used device as a result of a comparison with the database
(5) shared data is additionally written to the data mounted in the device via the host PC (the information becomes available to the new device).

FIGS. 16 to 21 are flowcharts showing the processes performed at the net authentication site.

Figure 16:
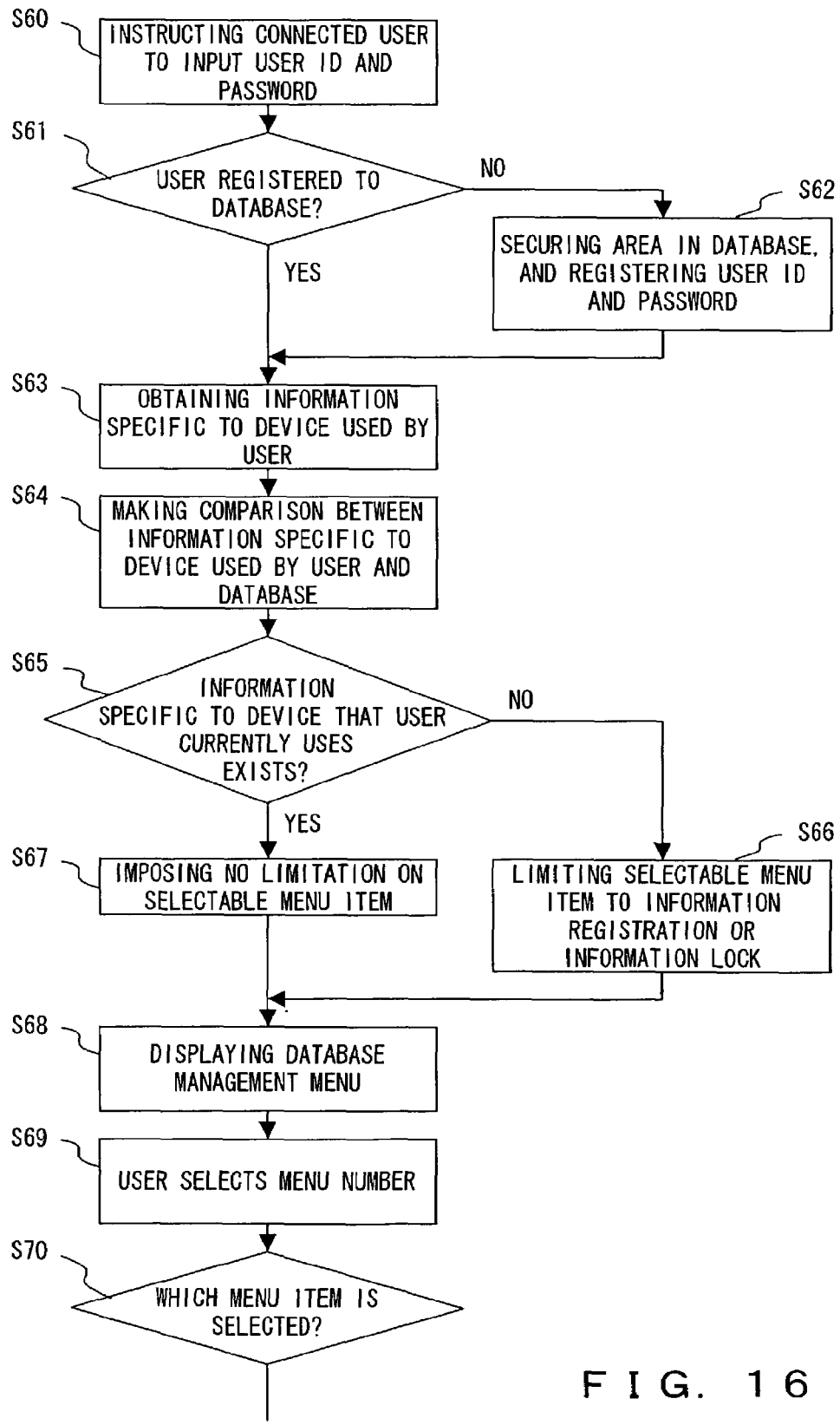
FIG. 16 is a flowchart showing the operations performed at the net authentication site (No. 1)

FIGS. 16 and 17 show the entire process flows.

Firstly, in step S60, a connected user is instructed to input a user ID and a password. In step S61, it is determined whether or not the user is a user who is registered to the database. If the result of the determination made in step S61 is "NO", an area is secured in the database, and the user ID and the password are registered in step S62. The process then proceeds to step S63. At this time, the access range of the data base is limited according to the given user ID and password as described above. If the result of the determination is "YES" in step S61, the process proceeds to step S63.

In step S63, information specific to the device used by the user is obtained. In step S64, the information specific to the device used by the user is compared with the database. In step S65, it is determined whether or not the information specific to the device that the user currently uses exists in the database.

If the result of the determination made in step S65 is "NO", the process proceeds to step S66. If the result of the determination is "YES", the process proceeds to step S67. In step S66, a selectable menu item is limited to information registration or information lock. In step S67, no limitations are imposed on a selectable menu item.

Then, in step S68, database management menu items are displayed. In step S69, a user selects a menu number. In step S70, which menu item is selected is determined. In step S71, a registration/update menu item for specific information is executed. In step S72, a restoration menu item for the specific information is executed. In step S73, a deletion menu item from the database is executed. In step S74, an information lock menu item is executed. If none of the menu items are selected, a process for monitoring the redundancy of registered data is performed in step S75. The process then goes back to step S60.

Figure 18:
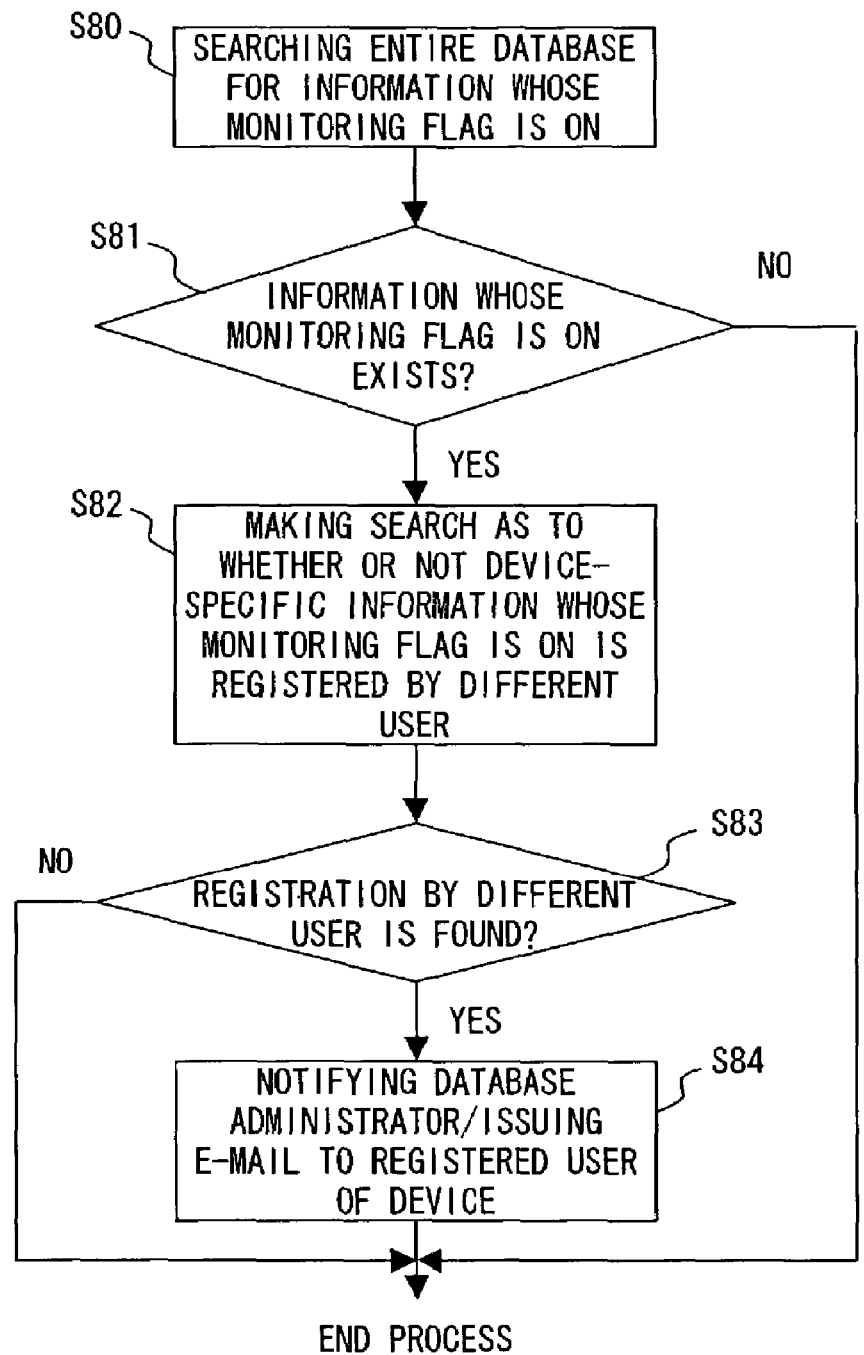
FIG. 18 is a flowchart showing the operations performed at the net authentication site (No. 3)

FIG. 18 is a flowchart showing the process for monitoring the redundancy of registered data in the database.

In step S80, information whose monitoring flag is set to ON is searched in the entire database. In step S81, it is determined whether or not the information whose monitoring flag is set to ON exists. If the result of the determination made in step S81 is "NO", the process is terminated. If the result of the determination made in step S81 is "YES", a search is made as to whether or not device-specific information whose monitoring flag is set to ON is registered by a different user in step S82. In step S83, it is determined whether or not the device-specific information whose monitoring flag is set to ON is registered by a different user. If the result of the determination is "NO", the process is terminated. If the result of the determination is "YES", the process proceeds to step S84. In step S84, the fact that the device-specific information whose monitoring flag is set to ON is registered is notified to the administrator of the database, and e-mail notifying this fact is issued to the registered user of the device. Here, the process is terminated.

Figure 19:
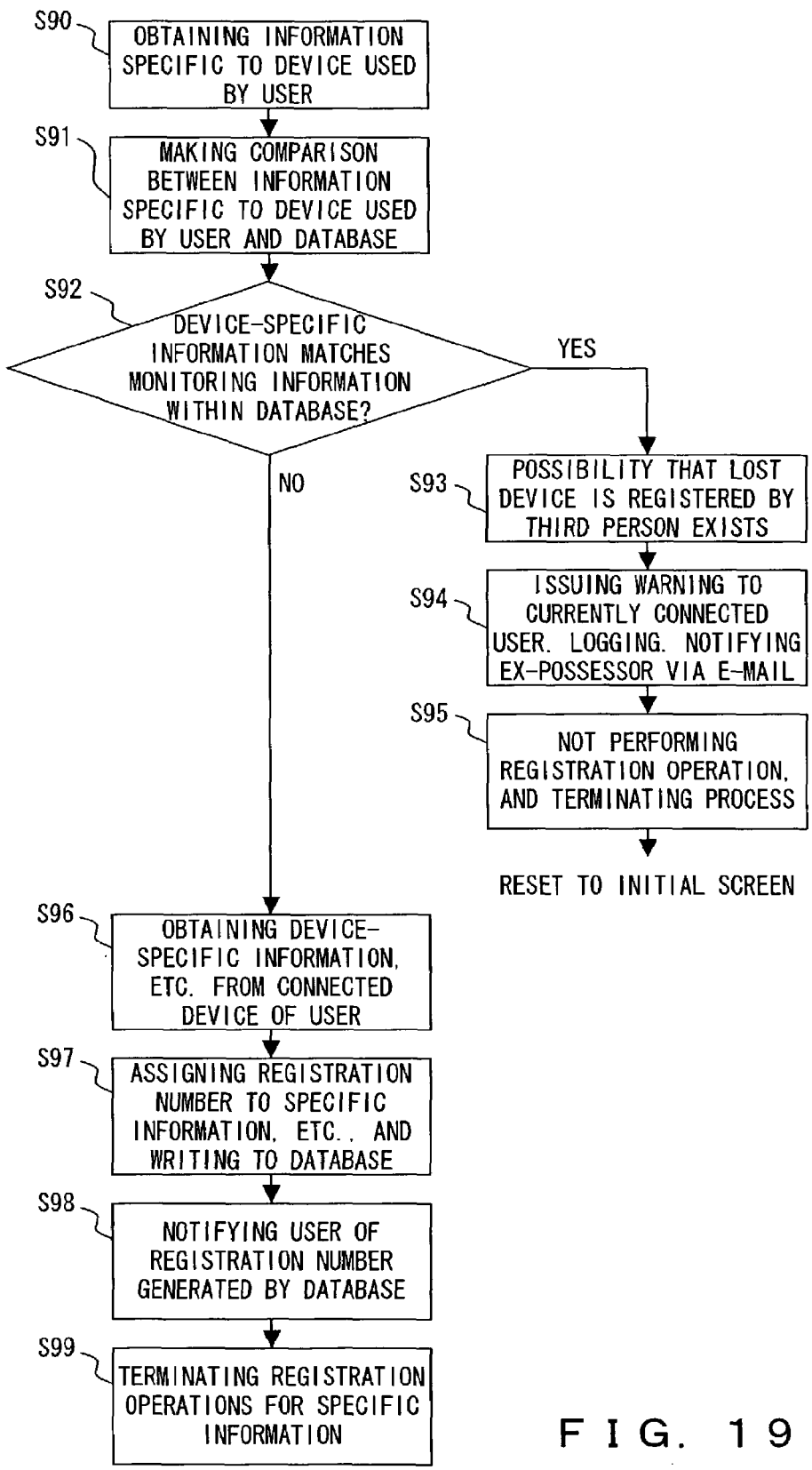
FIG. 19 is a flowchart showing the operations performed at the net authentication site (No. 4)

FIG. 19 is a flowchart showing the process performed when an information registration menu item is selected.

In step S90, information specific to a device used by a user is obtained. In step S91, the information specific to the device used by the user is compared with the database. In step S92, it is determined whether or not the information specific to the device matches the information to be monitored within the database (monitored information: registered device-specific information, etc.). If the result of the determination made in step S92 is "YES", the possibility that the lost device is registered by a third person is determined to exist. In step S94, warning is issued to the currently connected user. Additionally, this fact is logged and notified to the registered person of the device via e-mail. No operation is performed in step S95, and the display is reset to the initial screen.

If the result of the determination is "NO" in step S92, device-specific information, etc. are obtained from the connected device of the user in step S96. In step S97, a registration number is assigned to the specific information, etc., and written to the database. In step S98, the registration number generated by the database is notified to the user. Then, in step S99, the registration process of the specific information is terminated.

Figure 20:
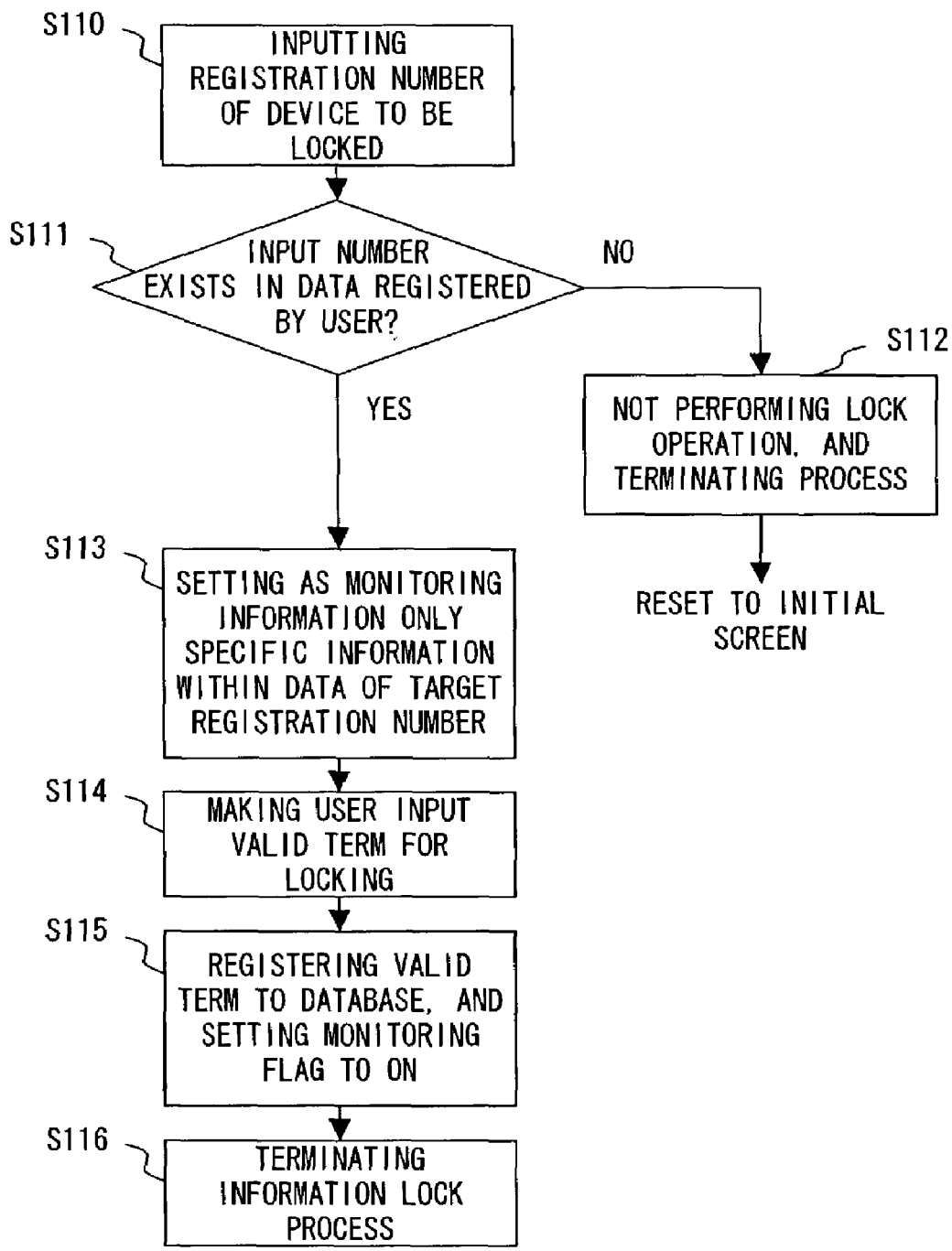
FIG. 20 is a flowchart showing the operations performed at the net authentication site (No. 5)

FIG. 20 is a flowchart showing the process performed when an information lock menu item is selected.

In step S110, a user is made to input the registration number of a device to be locked. In step S111, it is determined whether or not an input number exists in the data registered by the user. If the result of the determination made in step S111 is "NO", a lock operation is not performed and the process is terminated in step S112. Then, the display is reset to the initial screen.

If the result of the determination made in step S111 is "YES", only specific information within the data of the target registration number is set as monitored information in step S113. Then, in step S114, the user is made to input a valid term during which the information is locked. In step S115, the valid term is registered to the database, and the monitoring flag is set to ON. Then, in step S116, the information lock process is terminated.

Figure 21:
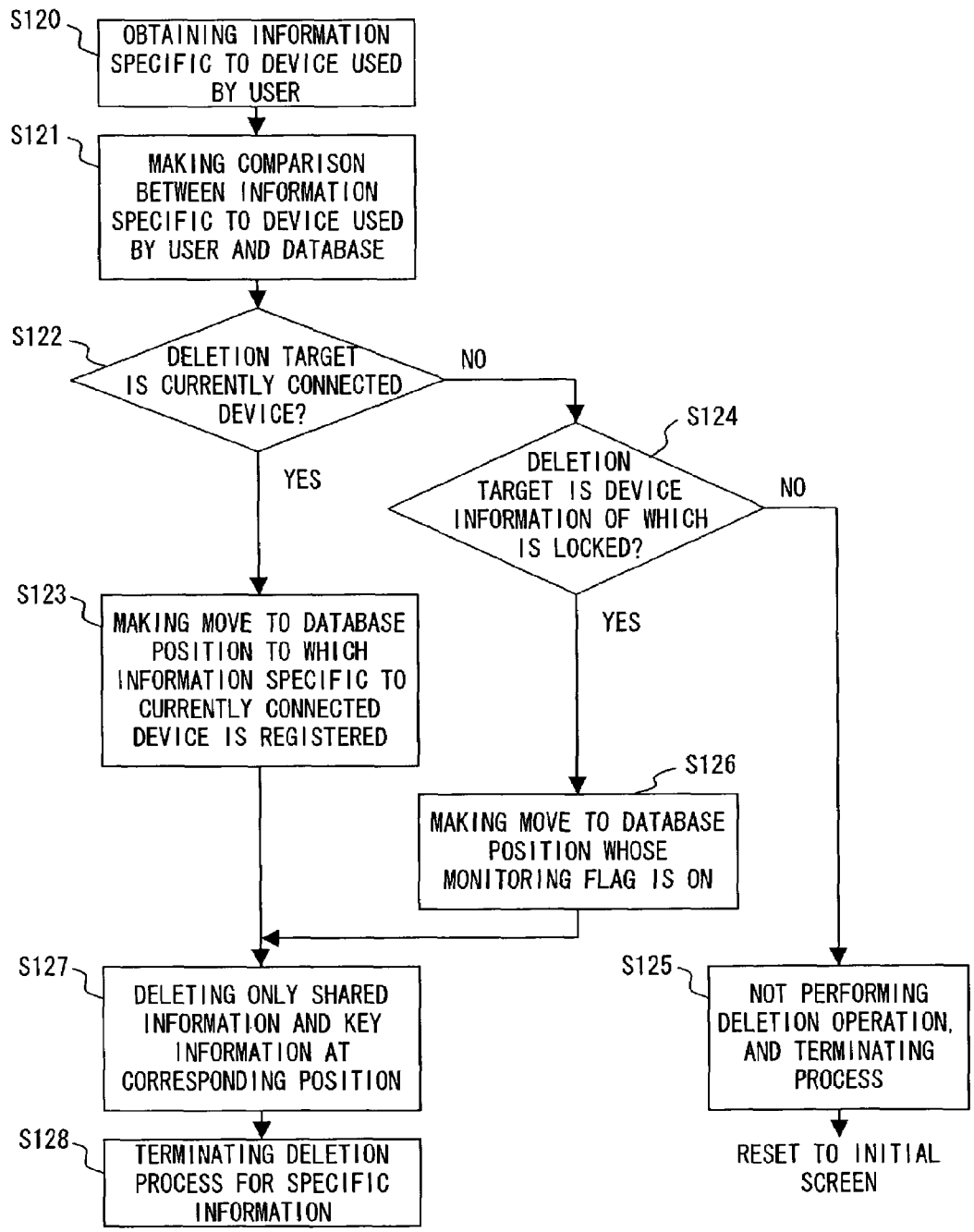
FIG. 21 is a flowchart showing the operations performed at the net authentication site (No. 6)

FIG. 21 is a flowchart showing the process performed when an information deletion menu item is selected.

In step S120, information specific to a device used by a user is obtained. In step S121, the information specific to the device used by the user is compared with the database. Then, in step S122, it is determined whether or not a deletion target is the currently connected device. If the result of the determination made in step S122 is "YES", a move is made to the position of the database, to which the information specific to the currently connected device is registered. The process then proceeds to step S127. If the result of the determination made in step S122 is "NO", it is further determined whether or not the deletion target is the device the information of which is locked. If the result of the determination made in step S124 is "NO", a deletion operation is not performed in step S125, and the display is reset to the initial screen. If the result of the determination made in step S124 is "YES", a move is made to the position of the database, at which the monitoring flag is set to ON. The process then proceeds to step S127.

In step S127, only the shared information and the key information at the corresponding position are deleted. In step S128, the deletion process for the specific information is terminated.

For example, if an encryption device is lost in the state where information is registered to a net authentication site, an encryption device can be restored to almost the same state by writing information (shared information and key information) except for encryption-circuit-specific information. Here, the reason that the encryption-circuit-specific information is not written is to prevent a plurality of identical encryption devices from existing when viewed from the specific information, if the encryption device is found afterward.

Figure 22:
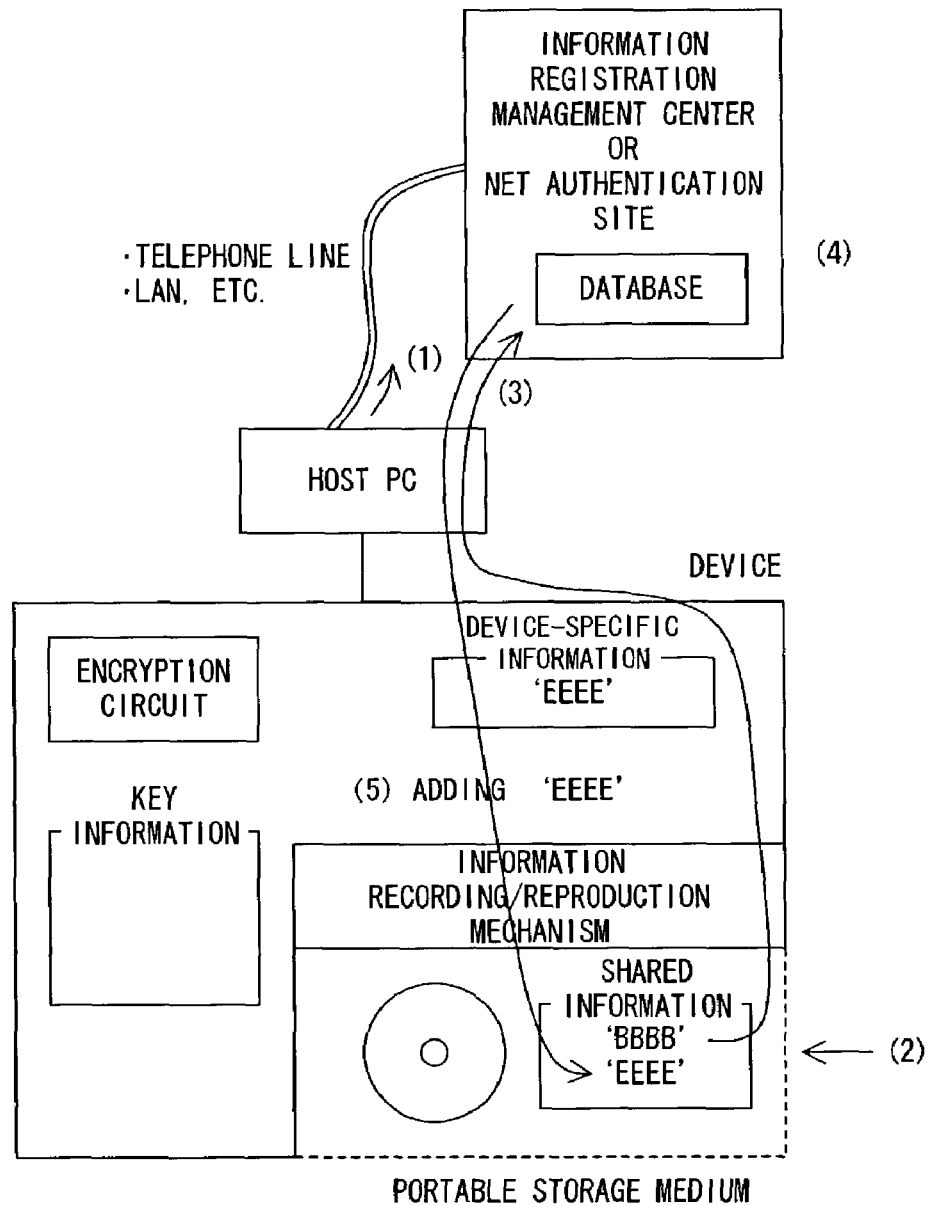
FIG. 22 shows the restoration operations performed by the internal circuit type apparatus.
Figure 23:
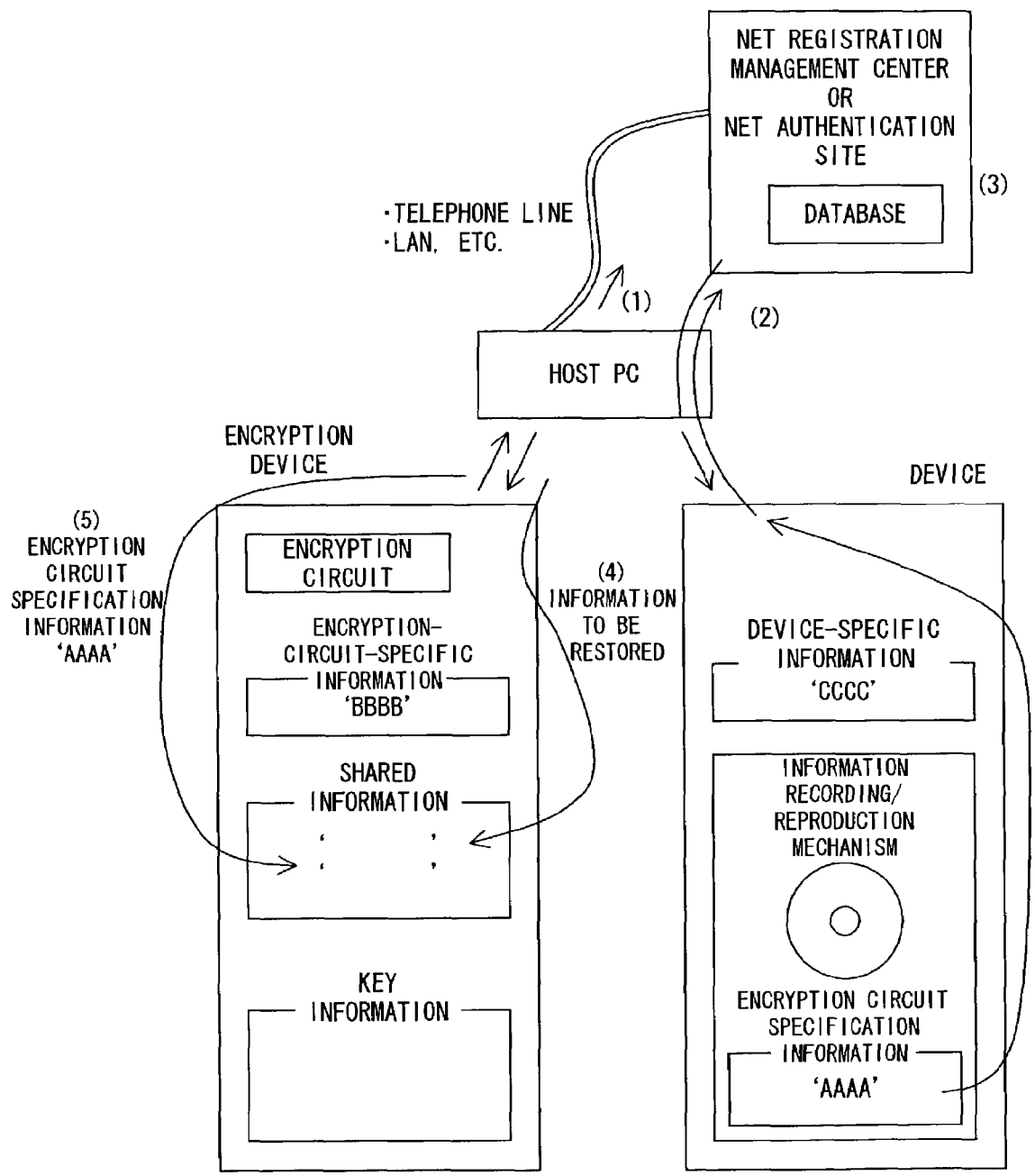
FIG. 23 shows the restoration operations performed by the external circuit type apparatus.

FIG. 22 shows the restoration operations performed by the internal circuit type, whereas FIG. 23 shows the restoration operations performed by the external circuit type.

In the case of the internal circuit type shown in FIG. 22, "restoration of specific information" is first selected from a menu at a net authentication site (1). At this time, data used by a previous device is mounted in a device (2). Next, shared information within the mounted data is read and transmitted to the net authentication site (3). If the device is determined to be an alternative to the previously used device as a result of the comparison with the database (4), the shared information is additionally written to the data mounted in the device via the host PC (a write of "EEEE") (5).

In the case of the external circuit type shown in FIG. 23, "restoration of specific information" is selected from a menu at a net authentication site (1). Then, encryption circuit specification information is read and transmitted to the net authentication site (2). At the net authentication site, a comparison is made between a database and the encryption circuit specification information, so that it is verified whether or not the current encryption circuit specification information indicates the encryption circuit possessed by a user (3). If a match is found as a result of the comparison, registered shared information and key information are written to the encryption circuit (4). Furthermore, information specific to the alternative encryption circuit is additionally written via the host PC (5). In this case, encryption circuit specification information "AAAA" is written as the shared information of the encryption device.

Figure 24:
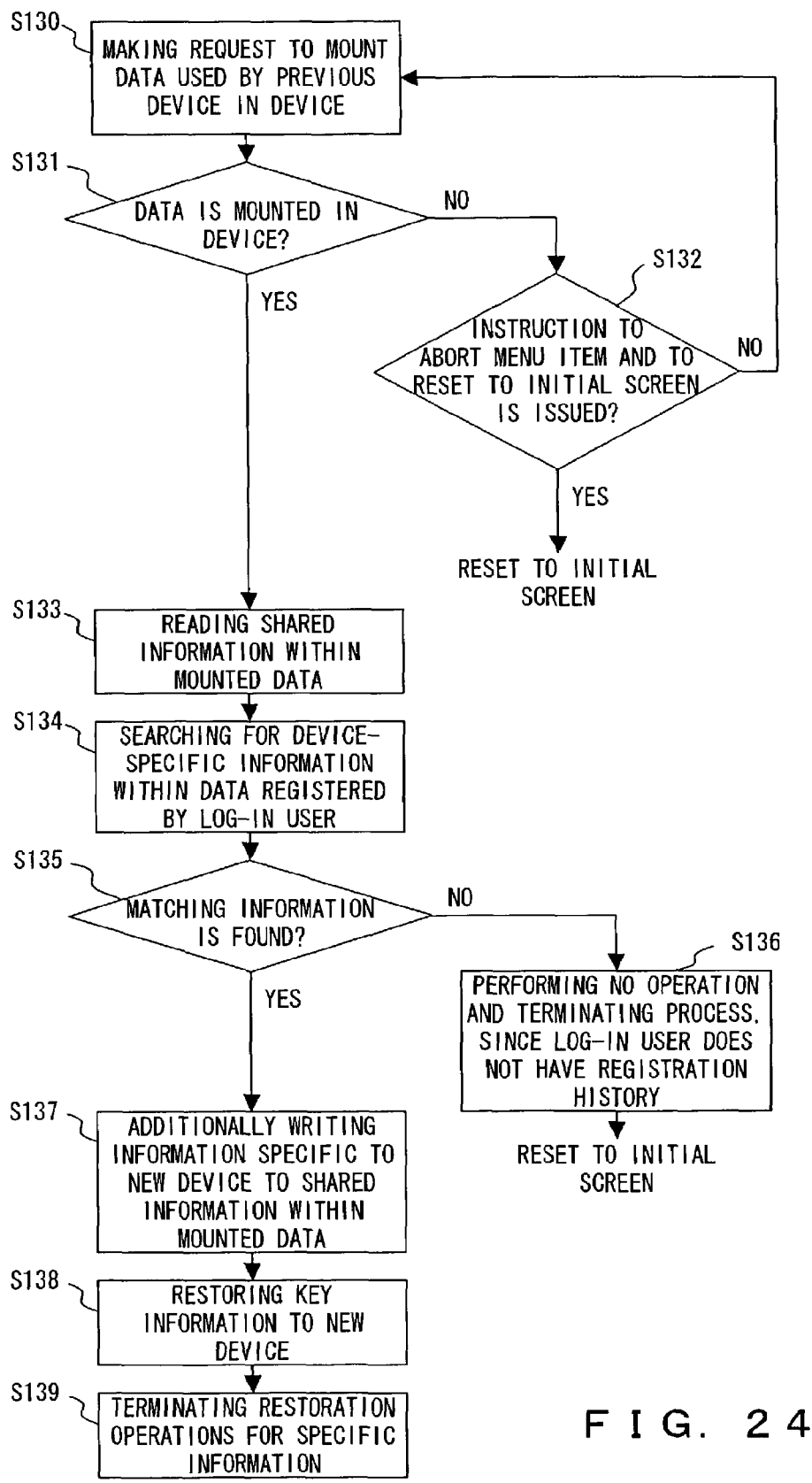
FIG. 24 is a flowchart showing the process performed at the net authentication site when a specific information restoration menu item is selected for the internal circuit type apparatus.
Figure 25:
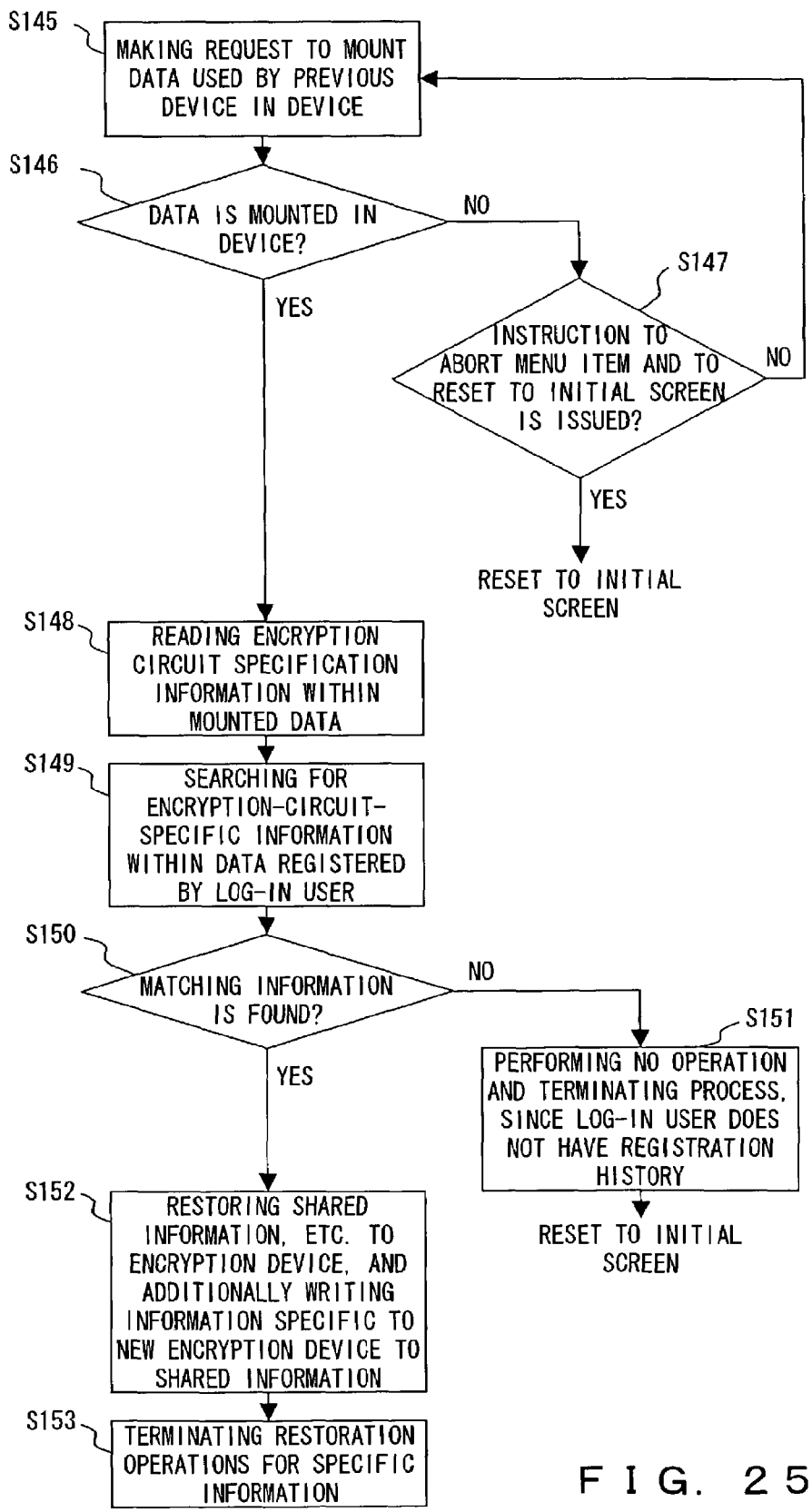
FIG. 25 is a flowchart showing the process performed at the net authentication site when a specific information restoration menu item is selected for the external circuit type apparatus.

FIG. 24 is a flowchart showing the process performed at a net authentication site when a specific information restoration menu item is selected for the internal circuit type. FIG. 25 is a flowchart showing the process performed at a net authentication site when a specific information restoration menu item is selected for the external circuit type.

In the case of the internal circuit type, as shown in FIG. 24, a request to mount data used by a previous device in the device is issued in step S130. Then, in step S131, it is determined whether or not the data is mounted in the device. If the result of the determination made in step S131 is "NO", the process proceeds to step S132.

In step S132, the execution of the menu item is aborted, and an instruction indicating whether or not to reset to the initial screen, which is issued from a user, is waited. If the instruction to reset to the initial screen is issued in step S132, the display is reset to the initial screen. If the display is not reset to the initial screen in step S132, the process goes back to step S130.

If the result of the determination made in step S131 is "YES", shared information within the mounted data is read in step S133. In step S134, device-specific information is searched in the data registered by the log-in user. Then, in step S135, it is determined whether or not matching information is found. If the result of the determination made in step S135 is "NO", no operation is performed and the process is terminated in step S136. This is because the log-in user does not have a registration history. The display is then reset to the initial screen.

If the result of the determination made in step S135 is "YES", information specific to the new device is additionally written to the shared information within the mounted data in step S137. In step S138, key information is restored to the new device. Then, in step S139, the restoration operations for the specific information are terminated.

In the case of the external circuit type, as shown in FIG. 25, a request to mount data used by a previous device in the new device is made in step S145. In step S146, it is determined whether or not the data is mounted in the device. If the result of the determination made in step S146 is "NO", the execution of the menu item is aborted, and an instruction indicating whether or not to reset to the initial screen is received from a user. If the instruction indicates the reset to the initial screen, the display is reset to the initial screen. Otherwise, the process goes back to step S145.

If the result of the determination made in step S146 is "YES", encryption circuit specification information within the mounted data is read in step S148. Then, in step S149, encryption-circuit-specific information is searched in the data registered by the log-in user in step S149. Then, in step S150, it is determined whether or not matching information is found. If the result of the determination made in step S150 is "NO", the process proceeds to step S151 in which no operation is performed and the process is terminated. This is because the user does not have a registration history. The display is then reset to the initial screen.

If the result of the determination made in step S150 is "YES", shared information, etc. are restored to the encryption device, and the information specific to the new encryption device is additionally written to the shared information in step S152. In step S153, the restoration process of the specific information is terminated.

FIG. 26 exemplifies the configuration of a database possessed by a net authentication site.

The database provides one management area per log-in user, and a log-in user uses his or her area. Note that, however, a log-in user cannot search and view information of other users. A log-in user can register a plurality of devices. A monitoring flag is set to ON if information is locked, and set to OFF when a valid term expires. A device is considered to be missing if the monitoring flag continues to be ON. If a different user attempts to register the device-specific information whose monitoring flag is set to ON, the database side denies the registration in order to prevent abuse by a third person.

As the contents registered to the database, a user ID being log-in information, password, registration number, monitoring flag, valid term, encryption-circuit-specific and device-specific information, shared information, and key information are stored in each management section.

By imposing a limitation on a device and an encryption device, the missing of a device can be coped with, and abuse with a different device can be prevented. Additionally, specific information can be managed at a third location (net authentication site, etc.). If specific information is registered to a net authentication site, information specific to a lost device can be restored. Namely, even if a device is lost, a shift to an alternative device can be made with a restoration function.

What is claimed is:

1. An information system configured to limit access to encrypted data stored on a storage medium, comprising:
    a first storing unit storing in an original encryption device having an encryption circuit encrypting/decrypting data, device-specific information for identifying the original encryption device, and one or more pieces of key information for encrypting/decrypting data stored on the medium;
    a second storing unit storing in the medium encryption circuit specification information specifying the encryption device to be used when encrypting/decrypting data;
    a detecting unit detecting a match between the encryption circuit specification information and device-specific information of device used to access encrypted data, when the encrypted data is accessed; and
    a restoring unit pre-storing device-specific information of the original encryption device and the key information at a predetermined site accessible through a network, and the restoring unit restoring at least the key information to a new encryption device from the predetermined site when the original encryption device becomes unavailable to allow only the new encryption device having the restored key information to access the encrypted data.

2. The system according to claim 1, wherein when an access is made to a database storing respective information at the predetermined site, the access is identified with a user ID and a password for authorization to make the access.

3. The system according to claim 2, wherein an access includes a limitation of an accessible range of data in the database.

4. The system according to claim 2, wherein the information of the database cannot be accessed for a predetermined time period according to a user specification.

5. The system according to claim 2, wherein information of a plurality of devices or a plurality of encryption devices at the predetermined site can be stored.

6. An information system configured to limit access to encrypted data stored on a storage medium, comprising:
    a first storing unit storing in an original encryption device having an encryption circuit encrypting/decrypting data device-specific information for identifying the original device, and one or more pieces of key information for encrypting/decrypting data stored on the medium;
    a second storing unit storing in the medium a shared information including one or more pieces of device-specific information of devices;
    a detecting unit detecting a match between the shared information and device-specific information of a device used to access encrypted data, when the encrypted data is accessed; and
    a restoring unit pre-storing the device-specific information of the original device and the key information at a predetermined site accessible through a network, the restoring unit restoring at least the key information to a new encryption device from the predetermined site and restoring a new shared information to the medium when the original device becomes unavailable to allow only the new device and the medium to which at least the key information is restored to access the data.

7. The system according to claim 6, wherein when an access is made to a database storing respective information at the predetermined site, the access is identified with a user ID and a password for authorization to make the access.

8. A method of renewing access to encrypted data stored on a storage medium, comprising the steps of:
    storing, in an original encryption device having an encryption circuit encrypting/decrypting data device-specific information for identifying the original encryption device and at least one piece of key information for encrypting/decrypting data stored on the medium, at a predetermined site through a network;
    storing in the medium encryption circuit specification information specifying the encryption device to be used when encrypting/decrypting data; and
    restoring at least the at least one piece of key information to a new encryption device from the predetermined site when the original encryption device becomes unavailable, whereby only the new encryption device is allowed to access the encrypted data.

9. The method according to claim 8, wherein when an access is made to a database storing respective information at the predetermined site the access is identified with a user ID and a password.

10. The method according to claim 9, wherein access is limited to an accessible range of data in the database.

11. The method according to claim 9, wherein information of a plurality of devices or a plurality of encryption devices at a predetermined site can be stored.

12. A method of renewing access to encrypted data stored on a storage medium, comprising:
    storing device-specific information for identifying an original encryption device, which has an encryption circuit encrypting/decrypting data device-specific information for identifying the original encryption device, and key information for encrypting/decrypting data stored on the medium, at a predetermined site through a network,
    restoring the key information to a new encryption device from the predetermined site and restoring a new shared information to the medium when the original device becomes unavailable, whereby only the new device is allowed to access the encrypted data in the medium.

13. The method according to claim 12, wherein when an access is made to a database storing respective information at the predetermined site the access is identified with a user ID and a password.

14. The method according to claim 13, wherein access is limited to an accessible range of data in the database.

15. The method according to claim 13, wherein the information in the database cannot be accessed for a predetermined time period according to user specification.

16. The method according to claim 13, wherein information of a plurality of new devices or a plurality of encryption devices at a predetermined site can be stored.

* * * * *

UNITED STATES PATENT AND TRADEMARK OFFICE
CERTIFICATE OF CORRECTION

PATENT NO. : 7,266,203 B2 Page 1 of 1
APPLICATION NO. : 10/280933
DATED : September 4, 2007
INVENTOR(S) : Fukawa It is certified that error appears in the above-identified patent and that said Letters Patent is hereby corrected as shown below:

Col. 13, line 22, delete "of device" and insert --of a device--.

Signed and Sealed this

Eighth Day of July, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,266,203 B2 |
| APPLICATION NO. | : 10/280933 |
| DATED | : September 4, 2007 |
| INVENTOR(S) | : Fukawa |

It is certified that error appears in the above-identified patent and that said Letters Patent is hereby corrected as shown below:

In the Claims:

Col. 13, line 22, delete "of device" and insert --of a device--.

Signed and Sealed this

Twenty-second Day of July, 2008

JON W. DUDAS
*Director of the United States Patent and Trademark Office*